US011868145B1

(12) United States Patent
Lopez et al.

(10) Patent No.: US 11,868,145 B1
(45) Date of Patent: Jan. 9, 2024

(54) SELECTING SAFE FLIGHT ROUTES BASED ON LOCALIZED POPULATION DENSITIES AND GROUND CONDITIONS

(71) Applicant: Amazon Technologies, Inc., Seattle, WA (US)

(72) Inventors: Javier Alonso Lopez, Edmonds, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 566 days.

(21) Appl. No.: 16/586,298

(22) Filed: Sep. 27, 2019

(51) Int. Cl.
*G05D 1/10* (2006.01)
*G05D 1/04* (2006.01)
*G08G 5/00* (2006.01)
*G06F 16/587* (2019.01)
*B64C 39/02* (2023.01)
*G06Q 10/047* (2023.01)
*G06V 20/10* (2022.01)
*B64U 101/00* (2023.01)

(52) U.S. Cl.
CPC ........... *G05D 1/106* (2019.05); *B64C 39/024* (2013.01); *G05D 1/042* (2013.01); *G06F 16/587* (2019.01); *G06Q 10/047* (2013.01); *G06V 20/176* (2022.01); *G08G 5/0069* (2013.01); *B64U 2101/00* (2023.01)

(58) Field of Classification Search
CPC .................................................... G05D 1/106
See application file for complete search history.

(56) References Cited

U.S. PATENT DOCUMENTS 9,262,929 B1 * 2/2016 Roy ...................... G08G 5/0034
9,518,821 B2 * 12/2016 Malay .................... G01C 21/20
(Continued)

FOREIGN PATENT DOCUMENTS

CN       108594858 B      10/2020
EP        3251108 A1 * 12/2017 ............. G05D 1/102
(Continued)

OTHER PUBLICATIONS

Dobson, James, E., LandScan: A Global Population Database for Estimating Populations at Risk, Photogrammetric Engineering and Remote Sensing • Jul. 2000 (https://www.researchgate.net/profile/Jerome-Dobson/publication/267450852_LandScan_A_Global_Population_Database_for_Estimating_Populations_at_Risk/links/5cdd754e4.*

(Continued)

*Primary Examiner* — Jean Paul Cass
(74) *Attorney, Agent, or Firm* — Athorus, PLLC

(57) ABSTRACT

A reliability map is generated by superimposing or associating populations or other intrinsic data is superimposed or associated with a geographic map of a region, which is divided into a grid having cells of uniform size. Densities of towns, cities or other geospatial areas are determined and assigned to cells of the grid, which have sizes corresponding to minimum dimensions of a corridor required for travel by an aerial vehicle. When a mission requiring travel from an origin to a destination within the region is identified, one or more paths of a safe route between the origin and the destination are selected based on the reliability map. The safe route is selected to avoid areas of high population density or locations of critical infrastructure such as schools, hospitals or public safety buildings.

20 Claims, 28 Drawing Sheets

GEOGRAPHIC MAP OF GEOSPATIAL AREAS WITHIN REGION

(56) References Cited

U.S. PATENT DOCUMENTS

| | | |
|---|---|---|
| 9,542,849 B1 | 1/2017 | Bertram et al. |
| 9,592,912 B1 | 3/2017 | Michini et al. |
| 9,594,372 B1 | 3/2017 | Sills et al. |
| 9,773,418 B1* | 9/2017 | Smith .................. G05D 1/104 |
| 9,817,396 B1 | 11/2017 | Takayama et al. |
| 9,849,981 B1 | 12/2017 | Burgess et al. |
| 9,953,540 B2 | 4/2018 | MacFarlane et al. |
| 10,102,758 B1* | 10/2018 | Beaurepaire .......... G08G 5/006 |
| 11,094,202 B2* | 8/2021 | Gong .................. G08G 5/0078 |
| 2002/0077876 A1 | 6/2002 | O'Meara et al. |
| 2009/0210109 A1* | 8/2009 | Ravenscroft .......... G01C 21/20 |
| | | 701/25 |
| 2012/0158280 A1* | 6/2012 | Ravenscroft ......... G08G 5/0034 |
| | | 701/400 |
| 2014/0018979 A1* | 1/2014 | Goossen ............. G06Q 10/047 |
| | | 701/3 |
| 2014/0188748 A1 | 7/2014 | Cavoue et al. |
| 2014/0330741 A1 | 11/2014 | Bialynicka-Birula et al. |
| 2015/0148988 A1* | 5/2015 | Fleck ..................... B64D 1/14 |
| | | 701/2 |
| 2015/0153740 A1* | 6/2015 | Ben-Shachar ........ G05D 1/105 |
| | | 701/16 |
| 2016/0050840 A1* | 2/2016 | Sauder ................. G05D 1/0094 |
| | | 701/3 |
| 2016/0202074 A1 | 7/2016 | Woodard et al. |
| 2017/0162059 A1 | 6/2017 | Jarrell |
| 2017/0178352 A1 | 6/2017 | Harmsen et al. |
| 2018/0025649 A1 | 1/2018 | Contreras et al. |
| 2018/0068567 A1* | 3/2018 | Gong .................. G08G 5/0039 |
| 2018/0156616 A1 | 6/2018 | Bennett et al. |
| 2019/0019423 A1* | 1/2019 | Choi ..................... G08G 5/045 |
| 2019/0287307 A1 | 9/2019 | Rogers et al. |
| 2020/0258400 A1* | 8/2020 | Yuan ..................... G06V 20/10 |
| 2020/0364456 A1 | 11/2020 | Tran et al. |
| 2020/0379118 A1 | 12/2020 | Reid et al. |
| 2021/0089055 A1* | 3/2021 | Tran .................... G08G 5/0082 |
| 2021/0163068 A1* | 6/2021 | Zhu ..................... B62D 15/0285 |
| 2021/0165426 A1* | 6/2021 | White ................ G01C 21/3804 |
| 2021/0173414 A1* | 6/2021 | Starr .................... G08G 5/045 |
| 2021/0173415 A1* | 6/2021 | Cajias ................. G08G 5/0069 |
| 2021/0225176 A1 | 7/2021 | Kusumi et al. |

FOREIGN PATENT DOCUMENTS

| | | | |
|---|---|---|---|
| EP | 3792896 A1 | 3/2021 | |
| WO | 2019099912 A1 | 5/2019 | |
| WO | 2019133048 A1 | 7/2019 | |
| WO | WO-2019133049 A1 * | 7/2019 | ........ H04W 36/0016 |

OTHER PUBLICATIONS

Ibrahim, M.; Youssef, M. (Jun. 1, 2011). "A Hidden Markov Model for Localization Using Low-End GSM Cell Phones". 2011 IEEE International Conference on Communications (hereinafter "Ibrahim").*

Liu, Yecheng and Yongjia Zhao, "A Virtual-Waypoint Based Artificial Potential Field Method for UAV Path Planning," Proceedings of 2016 IEEE Chinese Guidance, Navigation and Control Conference (CGNCC), August 12-14, Nanjing, China (URL: https://ieeexplore.ieee.org/abstract/document/7828913.

* cited by examiner

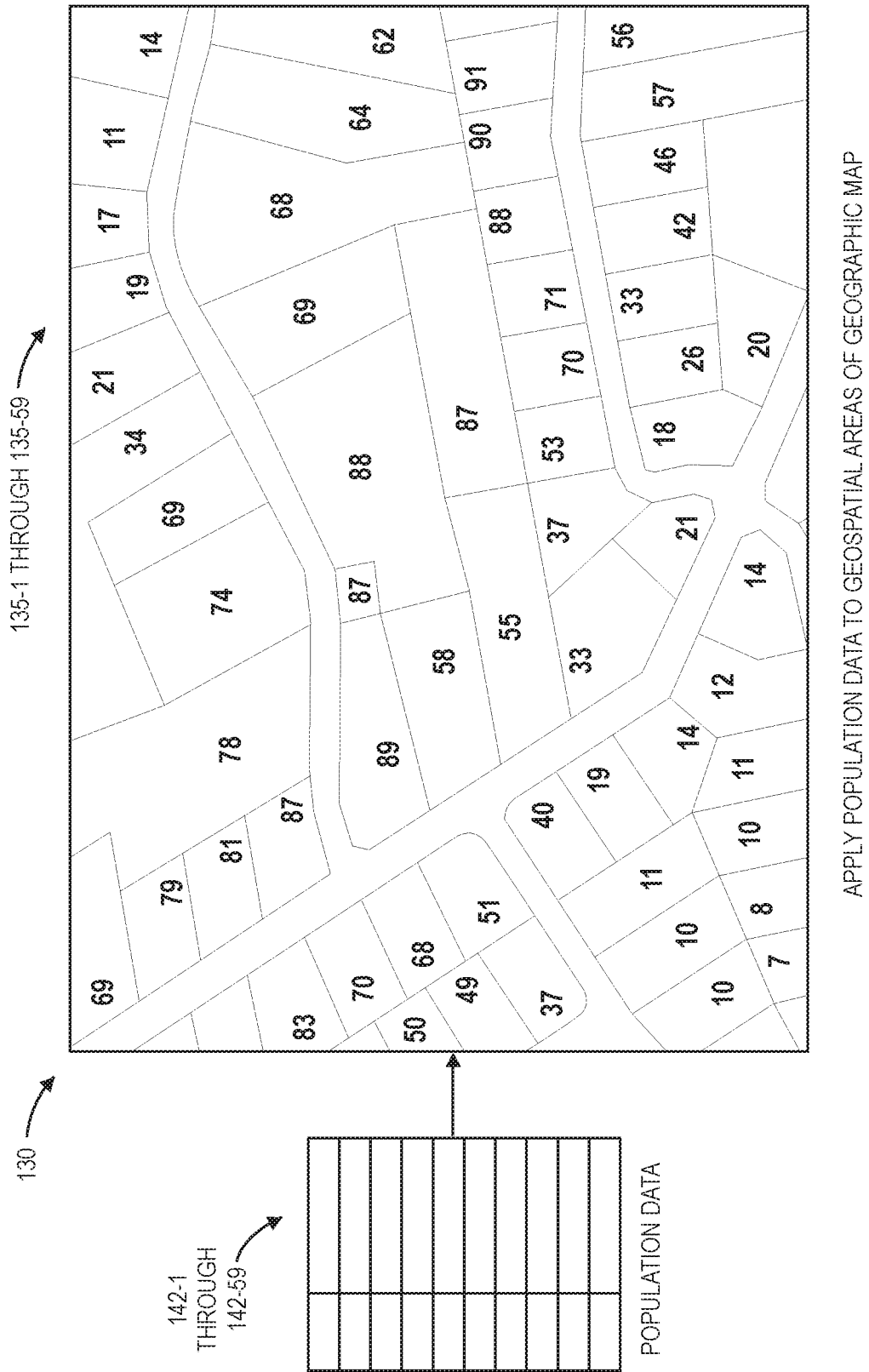

REGION DIVIDED INTO CELLS AND POPULATION DENSITIES ASSIGNED TO CELLS BASED ON POPULATION DENSITIES

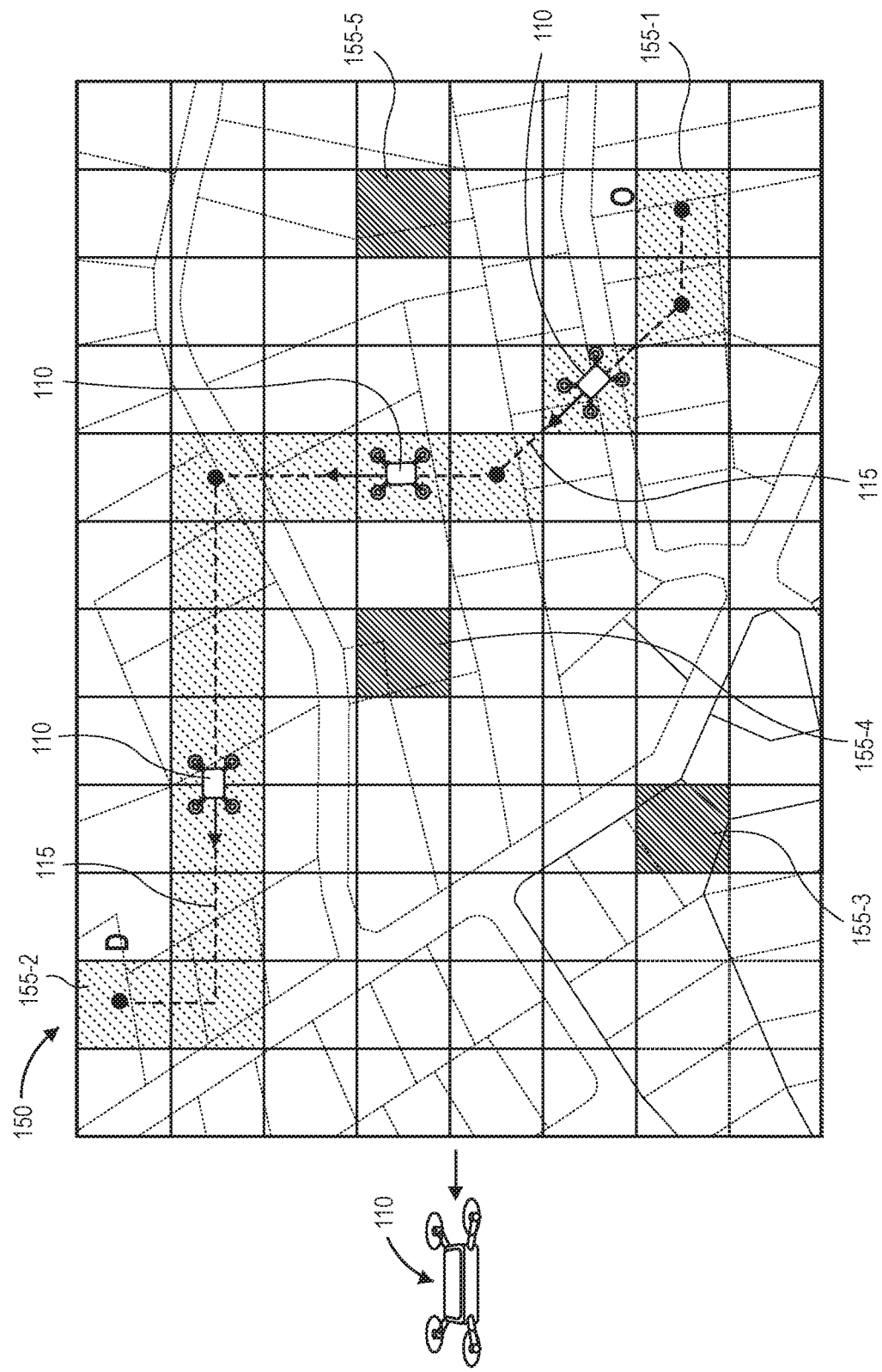

OVERLAY POPULATION DENSITIES ONTO GEOSPATIAL AREAS

OVERLAY GRID OF UxU CELLS ONTO POPULATION MAP

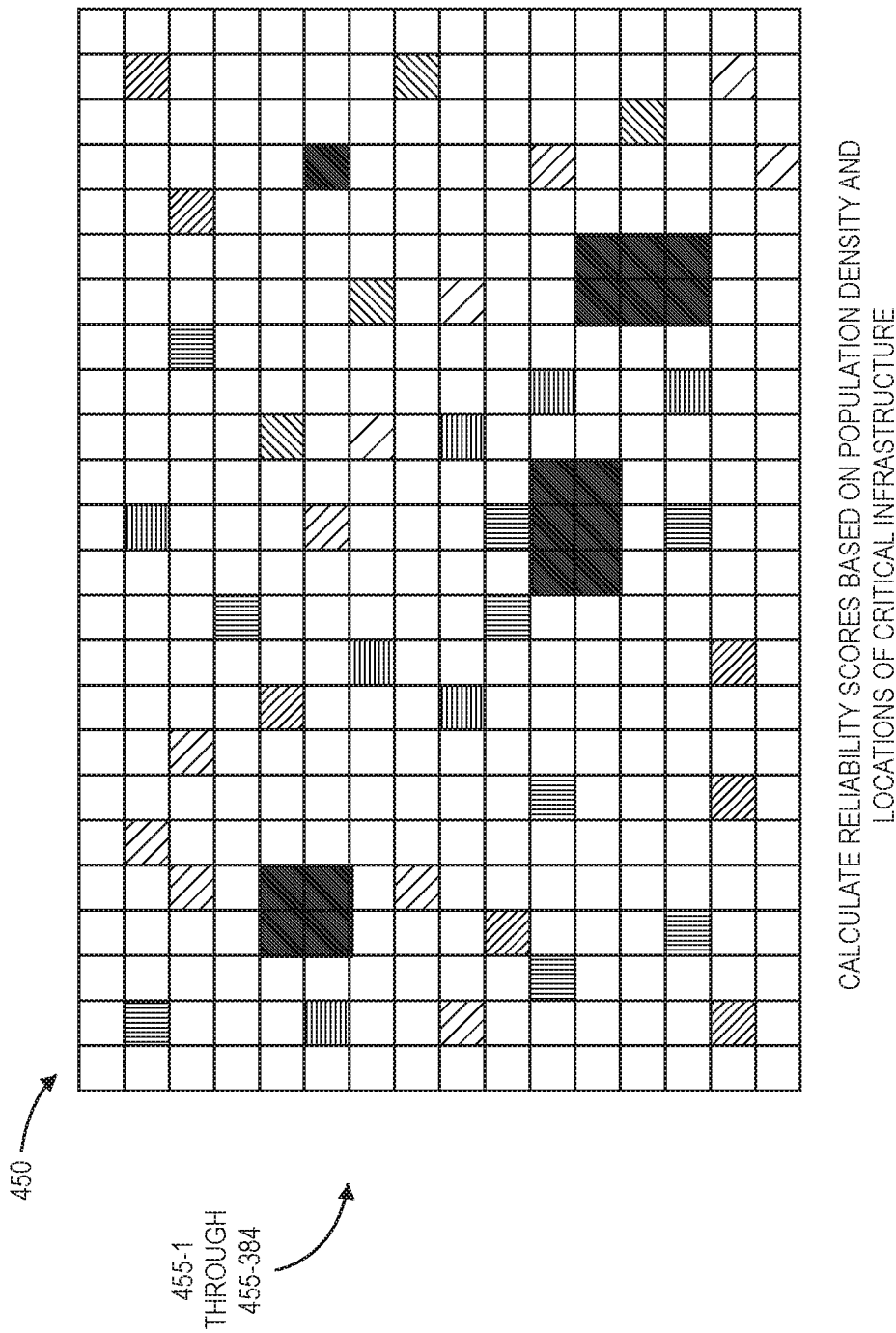

EVEN DISTRIBUTION OF POPULATION DATA IN REGION $$k_{ij} = \frac{N}{(I)(J)(x_j)(y_j)}$$

FIG. 6D SUMMERTIME

ALGORITHM FOR DETERMINING SAFEST PATH VIA CELL x $A^* = g(x) + h(x)$
WHERE $g(x) = d_{O\text{-}x} + k(x) + \frac{1}{N} \sum_{i}^{N} k(x_i) \in Adj(x)$
$h(x) = \text{HEURISTIC}$

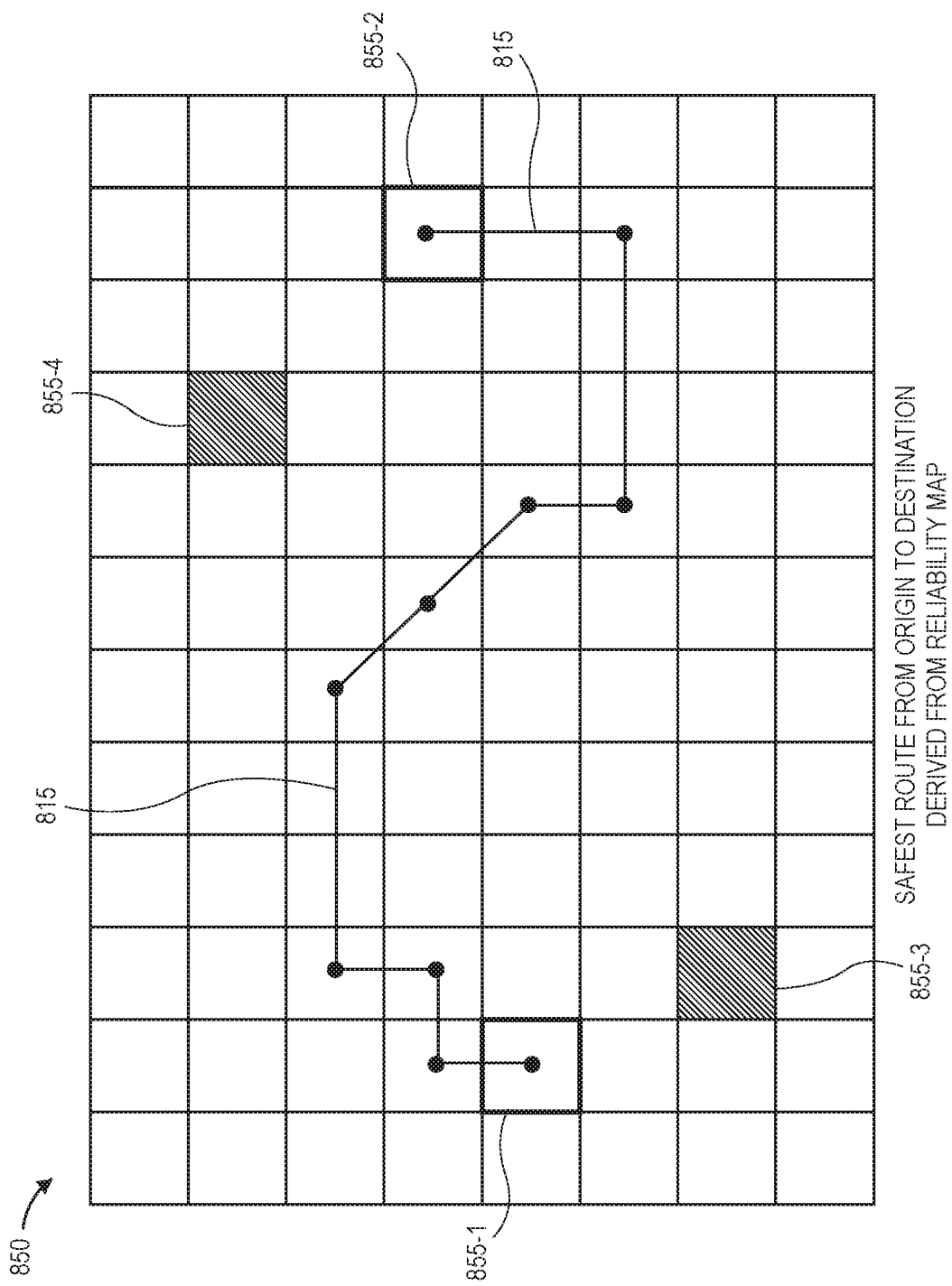

SELECTING SAFE FLIGHT ROUTES BASED ON LOCALIZED POPULATION DENSITIES AND GROUND CONDITIONS

BACKGROUND

The frequency and number of applications in which aerial vehicles, such as unmanned aerial vehicles (or "UAV") or drones, are used continue to increase over time, even as aerial vehicles become both more capable and more complex, or shrink in size. In particular, unmanned aerial vehicles have been used in making deliveries, performing monitoring operations, responding to critical issues affecting public or private safety, or completing other tasks. Unlike large aerial vehicles such as jumbo jets or propeller planes, which are typically assigned dedicated flight paths and instructed to remain above altitudes, some unmanned aerial vehicles are designed to fly at lower speeds and altitudes, or with few limitations on lateral, horizontal or vertical movements.

Where unmanned aerial vehicles engage in airborne operations over or near populated areas, proper considerations must be made to maximize the reliability of a flight plan and to ensure the safety of persons or property on the ground below.

BRIEF DESCRIPTION OF THE DRAWINGS

FIGS. 1A through 1F are views of aspects of one system for selecting safe flight routes in accordance with embodiments of the present disclosure.

FIGS. 4A through 4I are views of aspects of systems for selecting safe flight routes in accordance with embodiments of the present disclosure.

FIGS. 6A through 6D are views of aspects of systems for selecting safe flight routes in accordance with embodiments of the present disclosure.

FIGS. 8A through 8C are views of aspects of systems for selecting safe flight routes in accordance with embodiments of the present disclosure.

DETAILED DESCRIPTION

Figure 1C:
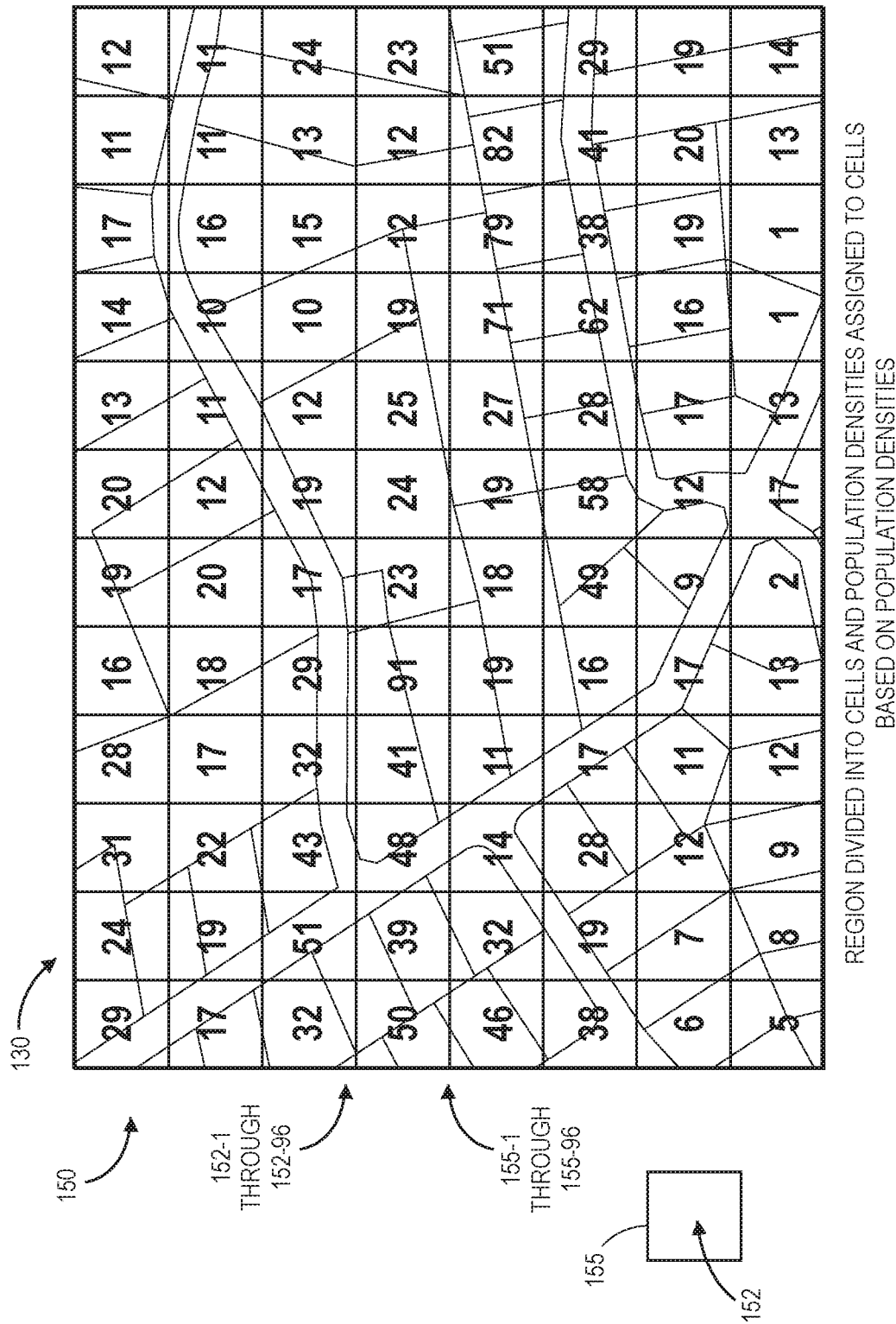

As is set forth in greater detail below, the systems and methods of the present disclosure are directed to selecting flight routes based on localized population densities or other conditions existing on the ground. More specifically, where population data is available for a variety of geospatial areas within the region, the population data may be normalized, e.g., into a grid, and applied to a geographic map of the region that includes boundaries of the geospatial areas in order to assign accurate population densities to the geospatial areas. Population data may be obtained for a region in any manner, and from any public or private sources.

With population densities applied to the geospatial areas of a geographic map, the geographic map may be divided into a grid of cells of substantially uniform size that is defined by one or more operational requirements of an aerial vehicle. Reliability scores may be calculated from population densities or other information or data regarding ground conditions (e.g., identifiers of specific features of infrastructure) and assigned to each of the cells in order to form a reliability map (or a reliability matrix). One or more paths or routes for the aerial vehicle may be selected based on the reliability map to satisfy reliability requirements for a given mission. A search algorithm may be executed to identify a path that minimizes overflight conditions over areas of high population densities, or areas that are identified as having high levels of risk on any basis. The search algorithm may consider costs for traveling from an origin of a mission to any given cell within the reliability map, as well as costs for traveling from any given cell to a destination within the reliability map. The systems and methods of the present disclosure may, therefore, be used to determine routes or paths for aerial vehicles for traveling over or in association with a region in order to meet standards or requirements of safety or reliability, which may change from time to time based on events or activities occurring within the region, or on any other basis.

In some embodiments, a search algorithm, such as an A* search algorithm, may be configured to select paths or routes for an aerial vehicle that specifically avoid not only highly populated areas but also areas that neighbor the highly populated areas based on the reliability map. Additionally, other intrinsic or extrinsic data regarding geospatial areas within a region may be applied to a geographic map or a reliability map, and considered in selecting one or more paths or routes for the aerial vehicle. For example, locations of infrastructure such as schools, hospitals, public safety facilities or military installations may also be included in a reliability map, and considered by a search algorithm in identifying a safest path or route within a region.

Referring to FIGS. 1A through 1F, a geographic map 130 of geospatial areas 135-1 through 135-59 within a region is shown. The geospatial areas 135-1 through 135-59 may be any number or set of parcels of land of any size or shape. For example, the geospatial areas 135-1 through 135-59 may be formally defined areas of land such as states, counties or municipalities, or portions thereof, or informally defined areas of land such as neighborhoods, residential complexes, office facilities, or others. Each of the geospatial areas 135-1 through 135-59 may have improvements or structures of any type or form thereon. The geographic map 130 may be generated based on data obtained from one or more Global Positioning System (or "GPS") satellites 195, or from any other source.

As is shown in FIG. 1B, population data 142-1 through 142-59 corresponding to each of the geospatial areas 135-1 through 135-59, or any other data intrinsic to the geospatial areas 135-1 through 135-59, is applied to the geographic map 130, e.g., in one or more layers. The population data 142-1 through 142-59 may include a count or an estimated number of persons within each of the geospatial areas 135-1 through 135-59. The population data 142-1 through 142-59 may be determined in any manner, such as from one or more public or private records (e.g., census data), or from other qualitative or quantitative sources. In some embodiments, the population data 142-1 through 142-59 may describe an average number of persons within any of the geospatial areas 135-1 through 135-59 at any given time or on any given day, or at different times or on different days. In some embodiments, the population data 142-1 through 142-59 may describe a predicted or anticipated number of the persons within the geospatial areas 135-1 through 135-59 at any given time or on any given day. The population data 142-1 through 142-59 may be predicted or calculated on any other basis, and obtained from any other source.

In accordance with embodiments of the present disclosure, geographic maps or other representations of any number of geospatial areas within a region that have been augmented with intrinsic data regarding ground conditions, such as population data, for such areas may be further partitioned or normalized into a grid or other set of uniformly shaped cells, tessellations or other sections. Population densities or other indicia of ground conditions within the sections may be considered in planning one or more routes or paths over the region. The sections of the grid may have any shapes, such as squares or other rectangles, triangles, pentagons, hexagons, octagons, or others, and any sizes. For example, in some embodiments, the sections of the grid may correspond to or include one or more minimum dimensions of a corridor or other space that is required for travel by an aerial vehicle within the region, and such dimensions may be selected on any basis regarding the travel by the aerial vehicle.

As is shown in FIG. 1C, a reliability map 150 of uniformly shaped cells 155-1 through 155-96 is applied to the geographic map 130, and a set of population densities 152-1 through 152-96 is calculated for the cells 155-1 through 155-96. For example, where one of the cells 155-1 through 155-96 lies entirely within one of the geospatial areas 135-1 through 135-59, a population density of the one of the geospatial areas 135-1 through 135-59 in which the one of the cells lies may be assigned to that cell. Alternatively, where one of the cells spans a boundary between two or more of the geospatial areas 135-1 through 135-59, a population density for the one of the cells may be calculated on a proportional basis, or on any other basis, along with any other considerations, such as population densities of any neighboring cells or geospatial areas, proportions of the cell that are occupied by the various geospatial areas, or on any other basis.

Figure 1D:
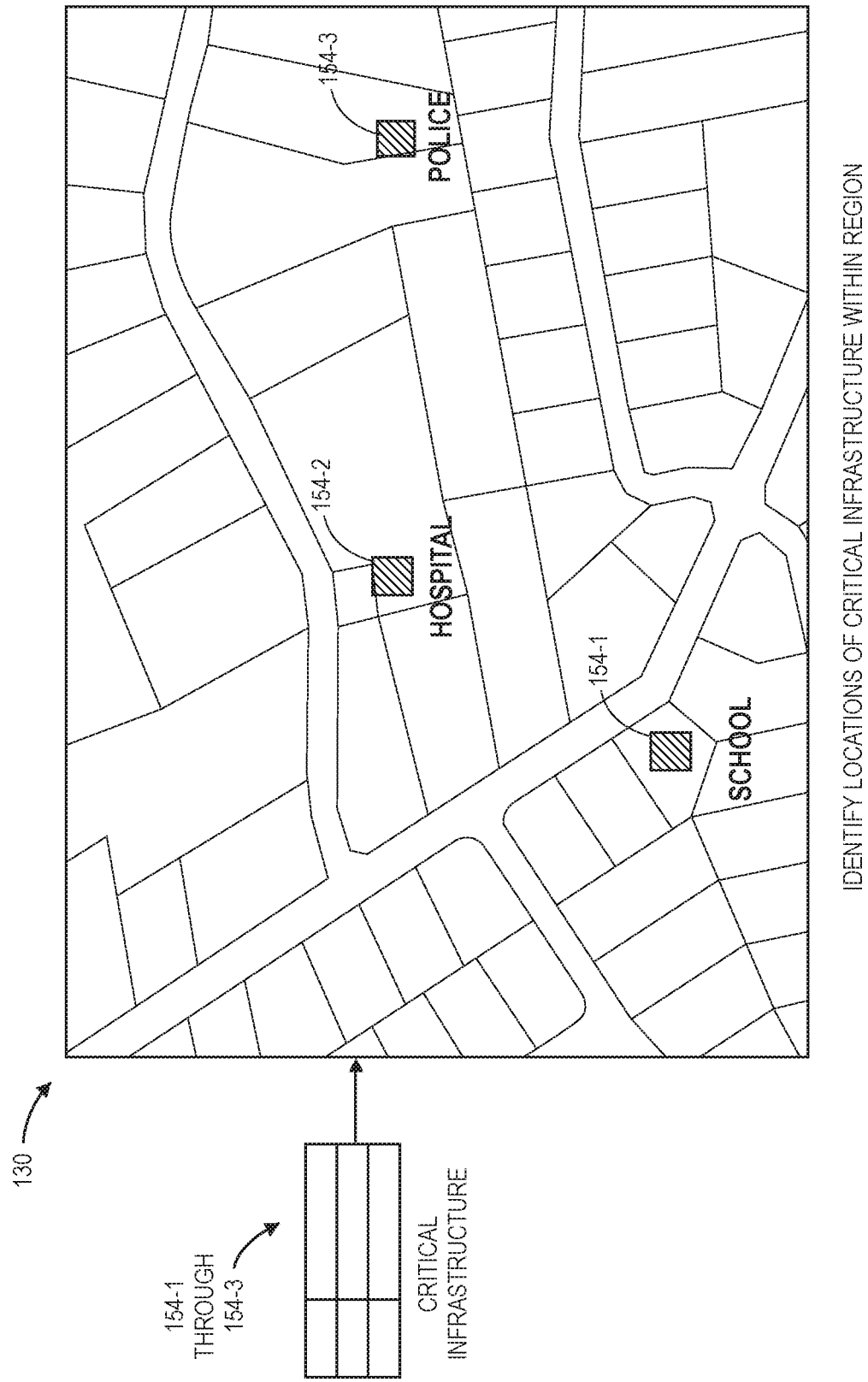

In addition to population data or other intrinsic data, a reliability map may also include locations of infrastructure within a region that may be considered in selecting one or more safe routes throughout the region. In some embodiments, such infrastructure may include any buildings, structures, areas or facilities having an elevated level of risk or priority as compared to surrounding buildings, structures, areas or facilities, and must or should not be flown over by any aerial vehicles, under all or most circumstances. As is shown in FIG. 1D, a set of geolocations 154-1, 154-2, 154-3 corresponding to a school 154-1, a hospital 154-2 or a police station 154-3 is applied to the reliability map 150. Because the geolocations 154-1, 154-2, 154-3 constitute locations of critical infrastructure that may be selectively avoided during the planning of one or more routes or paths, and cells encompassing the geolocations 154-1, 154-2, 154-3 may be deemed to correspond to avoidable zones of the geographic map 130.

Figure 1E:
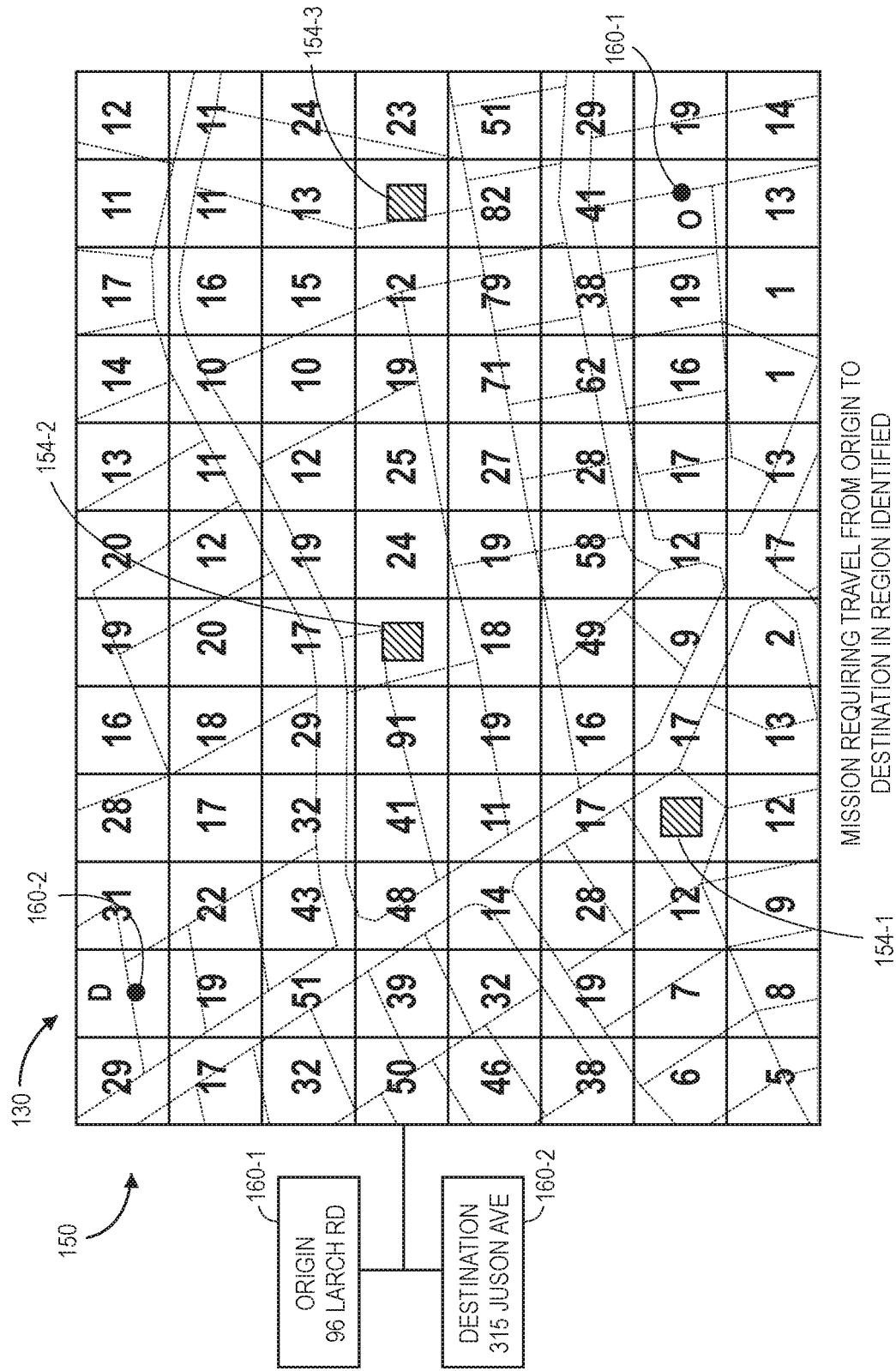

After the reliability map 150 has been formed from population data and locations of critical infrastructure applied to a geographic map, one or more safe routes or paths between an origin and a destination may be selected based on the geographic map when planning a mission for an aerial vehicle. As is shown in FIG. 1E, a mission requiring travel within a region covered by the geographic map 130 is identified. According to the mission, an aerial vehicle must travel from an origin 160-1 to a destination 160-2.

As is shown in FIG. 1F, a path 115 for an aerial vehicle 110 is generated based on the reliability map 150. The path 115 extends between a cell 155-1 corresponding to a zone that includes the origin 160-1 and a cell 155-2 corresponding a zone that includes the destination 160-2. The path 115 may be selected in order to meet standards or requirements of safety or reliability, which may change from time to time, such as by reducing or minimizing population densities over which the aerial vehicle 110 will fly while also avoiding a cell 155-3 corresponding to a zone that includes the school 154-1, a cell 155-4 corresponding to a zone that includes the hospital 154-2 and a cell 155-5 corresponding to a zone that includes the police station 154-3.

For example, in some embodiments, the path 115 may be selected according to a search algorithm, or a cost minimization algorithm, that considers costs of traveling between various points within the grid 150, e.g., between points corresponding to centers of the cells 155-1 through 155-96. In some embodiments, the search algorithm may be an A* search algorithm that calculates a unitless measure of cost associated with traveling from an origin, viz., the cell 155-1, to any of the other cells 155-2 through 155-96, based on the population density of such cells, and any surrounding cells. In some embodiments, the search algorithm may further calculate a cost associated with traveling from any of the cells to a destination, viz., the cell 155-2, under any approach, such as a Manhattan approach, a Euclidean approach, or any other approach. For example, a search algorithm or a cost minimization algorithm may consider a cost of moving between cells in any of four directions (e.g., vertically up, vertically down, horizontally left or horizontally right on the reliability map 150), in any of eight directions (e.g., vertically up, vertically down, horizontally left or horizontally right on the reliability map 150, as well as any diagonals between vertical and horizontal directions). Additionally, the search algorithm may be further configured to avoid predetermined zones, e.g., zones corresponding to the cells 155-3, 155-4, 155-5, that include the critical infrastructure. For example, in some embodiments, the cells 155-3, 155-4, 155-5 of the reliability map 150 may be deemed impassible under any circumstances, and a search algorithm may block such cells 155-3, 155-4, 155-5, or be configured to fail to consider the cells 155-3, 155-4, 155-5 in generating any route or path. Alternatively, in some other embodiments, the cells 155-3, 155-4, 155-5 may be assigned artificially high levels of intrinsic data, such as population densities, as compared to cells that do not include any critical infrastructure, in order to increase the costs associated with travel over zones corresponding to cells. Therefore, the search algorithm may still consider the cells 155-3, 155-4, 155-5 in generating routes or paths, and may include one or more of the cells 155-3, 155-4, 155-5 in a route or path to the extent that the route or path has a sufficiently low level of risk, or a sufficiently high level of reliability, as compared to other routes or paths that do not include such cells. Additionally, cells that neighbor cells including critical infrastructure may likewise be deemed impassible or blocked, or may be deemed passible or considered, in accordance with embodiments of the present disclosure.

Accordingly, the systems and methods of the present disclosure are directed to selecting flight routes throughout a region based on localized population densities or other conditions existing on the ground. Population data or other intrinsic data for a plurality of geospatial data may be identified and normalized, e.g., into a grid, and applied to a geographic map of the region that includes boundaries of such geospatial areas in order to assign accurate densities of the population data or intrinsic data to the geospatial areas. A reliability map (or a reliability matrix) may be generated by dividing a geographic map into a grid of cells, tessellations or other sections having a substantially uniform size that is defined by one or more operational requirements of an aerial vehicle, and assigning reliability scores to such cells based on the population data or other intrinsic data, or any other ground conditions. One or more routes or paths for the aerial vehicle may be selected from a reliability map in order to satisfy reliability requirements for a given mission. A search algorithm, such as an A* search algorithm, may be executed to identify a route or a path that meets standards or requirements of safety or reliability, such as by reducing or minimizing overflight conditions over areas of high population densities based on the reliability map. The search algorithm may consider costs for traveling from an origin of a mission to any given cell within the reliability map, as well as costs associate with traveling from any given cell within the reliability map to a destination of the mission. In some other embodiments, population data may be obtained from a public or private source, such as one or more sets of data, e.g., LandScan data maintained by the United States Department of Energy's Oak Ridge National Laboratory, WorldPop data maintained by the University of Southampton, or any other sets of data.

Figure 2:
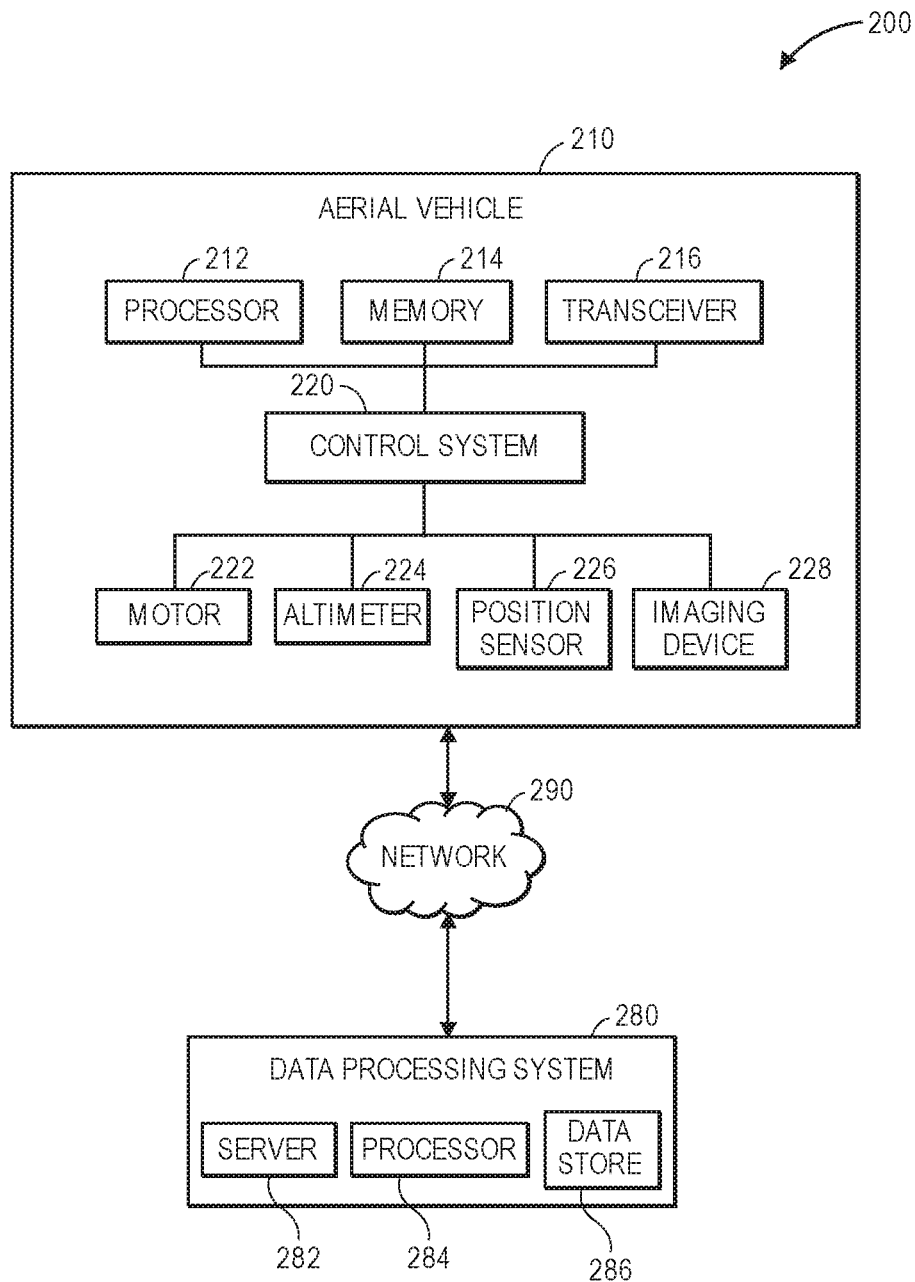
FIG. 2 is a block diagram of one system for selecting safe flight routes in accordance with embodiments of the present disclosure.

Referring to FIG. 2, a block diagram of one system 200 for selecting safe flight routes in accordance with embodiments of the present disclosure is shown. The system 200 of FIG. 2 includes an aerial vehicle 210 and a data processing system 280 connected to one another over a network 290, which may include the Internet in whole or in part. Except where otherwise noted, reference numerals preceded by the number "2" shown in FIG. 2 indicate components or features that are similar to components or features having reference numerals preceded by the number "1" shown in FIGS. 1A through 1F.

As is shown in FIG. 2, the aerial vehicle 210 includes a processor 212, a memory 214 and a transceiver 216. The aerial vehicle 210 further includes a control system 220, a plurality of propulsion motors 222, an altimeter 224, a position sensor 226 and an imaging device 228.

The processor 212 may be configured to perform any type or form of computing function associated with the operation of the aerial vehicle 210, including but not limited to the execution of one or more machine learning algorithms or techniques. The processor 212 may also be configured to execute any other algorithms or techniques (e.g., object detection or recognition algorithms or techniques) associated with one or more applications, purposes or functions, e.g., to select at least one of a course, a speed, an altitude or an orientation (e.g., one or more of a yaw angle, a pitch angle or a roll angle) for the safe operation of the aerial vehicle 210.

For example, the processor 212 may be configured to control any aspects of the operation of the aerial vehicle 210 and the one or more computer-based components thereon, including but not limited to the propulsion motors 222, the altimeter 224, the position sensor 226 and/or the imaging device 228. The processor 212 may control the operation of one or more control systems or modules, such as the control system 220, for generating instructions for conducting operations of one or more of the propulsion motors 222, the altimeter 224, the position sensor 226 and/or the imaging device 228, or for interpreting information or data captured using one or more other sensors. Such control systems or modules may be associated with one or more other computing devices or machines, and may communicate with the data processing system 280 or one or more other computer devices or aerial vehicles (not shown) over the network 290 by the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor unit such as a CPU or a GPU having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., map data, or instructions for operating the aerial vehicle 210, or information or data captured during operations of the aerial vehicle 210. For example, the memory 214 may be configured to store any relevant information regarding the operation of the aerial vehicle 210 including but not limited to courses, speeds, altitudes or orientations of the aerial vehicle 210 at one or more locations, or one or more operating characteristics (e.g., numbers of propulsion motors 222 that are operating and at which speeds, numbers of control surfaces that are operated and at which angles or distances), environmental conditions (e.g., weather projections, ground conditions, cloud coverage, sunshine or other information or data), imaging data or any other information or data regarding such locations. The memory 214 may be configured to store executable instructions, imaging data, flight routes or paths, or flight control parameters and/or other data items accessible by or to the processor 212. The memory 214 may be implemented using any suitable memory technology, such as random-access memory (or "RAM"), static RAM (or "SRAM"), synchronous dynamic RAM (or "SDRAM"), nonvolatile/Flash-type memory, or any other type of memory. In some embodiments, program instructions, imaging data, flight routes or paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 216 may further include or be in communication with one or more input/output (or "I/O") interfaces, network interfaces and/or I/O devices, and may be configured to allow information or data to be exchanged between one or more of the components of the aerial vehicle 210, or to one or more other computer devices or systems (e.g., other aerial vehicles, not shown) via the network 290. For example, in some embodiments, the transceiver 216 may be configured to coordinate I/O traffic between the processor 212 and one or more onboard or external computer devices or components, e.g., the propulsion motors 222, the altimeter 224, the position sensor 226 and/or the imaging device 228. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or integrated with the processor 212.

The control system 220 may include one or more electronic speed controls, power supplies, navigation systems and/or payload engagement controllers for controlling aspects of the operation of the aerial vehicle 210, as desired. For example, the control system 220 may be configured to cause or control the operation of one or more of the propulsion motors 222, the altimeter 224, the position sensor 226 and/or the imaging device 228, such as to cause one or more of the propulsion motors 222 to rotate propellers at desired speeds, to capture information or data regarding altitudes, positions and/or speeds, and to cause one or more of the imaging devices 228 to capture any imaging data (e.g., still or moving images) as well as any associated audio data and/or metadata. The control system 220 may also operate the one or more propulsion motors 222 to cause such propellers to be aligned in selected positions or angles. The control system 220 may further control any other aspects of the aerial vehicle 210, including but not limited to the operation of one or more control surfaces (not shown) such as wings, rudders, ailerons, elevators, flaps, brakes, slats or other features within desired ranges, or the enactment with or release of one or more items by one or more engagement systems (not shown). In some embodiments, the control system 220 may be integrated with one or more of the processor 212, the memory 214 and/or the transceiver 216.

The propulsion motors 222 may be any type or form of motor (e.g., electric, gasoline-powered or any other type of motor) capable of generating sufficient rotational speeds of one or more propellers or other components to provide lift and/or thrust forces to the aerial vehicle 210 and any payload engaged thereby, or to aerially transport any payload engaged thereby. In some embodiments, one or more of the propulsion motors 222 may be a brushless direct current ("DC") multi-phase motor such as an outrunner brushless motor or an inrunner brushless motor.

The aerial vehicle 210 may include any number of such propulsion motors 222 of any kind. For example, one or more of the propulsion motors 222 may be aligned or configured to provide forces of lift to the aerial vehicle 210, exclusively, while one or more of the propulsion motors 222 may be aligned or configured to provide forces of thrust to the aerial vehicle 210, exclusively. Alternatively, one or more of the propulsion motors 222 may be aligned or configured to provide forces of lift and forces of thrust to the aerial vehicle 210, as needed. For example, the propulsion motors 222 may be fixed in their orientation on the aerial vehicle 210, or configured to vary their respective orientations, e.g., a tilt-rotor aircraft. Moreover, the propulsion motors 222 may be aligned or configured to operate with different capacities or ratings, or at different speeds, or coupled to propellers having different sizes and shapes. Additionally, one or more of the propulsion motors 222 may be an electric motor, e.g., a brushless DC multi-phase motor, and one or more of the propulsion motors 222 may be a gasoline-powered motor.

Each of the propulsion motors 222 may be coupled to one or more propellers (or rotors or rotatable systems) having a plurality of shaped blades joined to a hub or boss. For example, each of such propellers may be rotatably mounted to a mast or shaft associated with a respective one of the propulsion motors 222 and may be configured to generate forces of thrust when rotated within a fluid. Each of such propellers may include any number of blades, and may be fixed pitch, adjustable pitch or variable pitch in nature. Moreover, one or more of such propellers may be banded or shielded in any manner. In some embodiments, one or more propellers may be configured to rotate about a vertical axis, and to provide forces of lift in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of lift and/or thrust in directions corresponding to such axes accordingly.

The position sensor 226 may be any device, component, system or instrument adapted to receive signals (e.g., trilateration data or information) relating to a position of the aerial vehicle 210, from one or more GPS satellites of a GPS network, from one or more towers or beacons from a cellular telephone network, or from any other source (not shown). In some embodiments, the position sensor 226, or position data received thereby, may be used to determine an airspeed of the aerial vehicle 210 over time. In some other embodiments, the aerial vehicle 210 may include one or more devices, components, systems, or instruments for determining a speed or velocity of the aerial vehicle 210, and may include related components (not shown) such as pitot tubes, accelerometers, or other features. For example, alternatively, or additionally, the aerial vehicle 210 may include one or more other devices, components, systems or instruments for determining information or data regarding the operation of the aerial vehicle, including but not limited to one or more airspeed sensors (e.g., any type or form of anemometer or other system for determining a speed of air flow within a vicinity of the aerial vehicle 210), which may include one or more pitot tubes, ultrasonic transceivers (e.g., transmitters and/or receivers) or other devices, components, systems or instruments, which may operate independently or in conjunction with one another. The aerial vehicle 210 may also include one or more other devices, components, systems or instruments for determining an altitude of the aerial vehicle 210, e.g., an altimeter or other device, component, system, or instrument having any number of barometers, transmitters, receivers, range finders (e.g., laser or radar), imaging devices or other features for determining altitudes above ground.

The imaging device 228 may be any form of optical recording devices that may be aligned with respect to any expected or ordinary operating orientation of the aerial vehicle 210, and are configured to photograph or otherwise record imaging data of objects or any other elements within fields of view forward of, aft of, lateral to, above or below the aerial vehicle 210, or for any other purpose. The imaging device 228 may include one or more processors, one or more memory or storage components, and one or more image sensors, e.g., color sensors, grayscale sensors, black-and-white sensors, depth sensors, or the like, and may further include one or more photosensitive surfaces, filters, chips, electrodes, clocks, boards, timers, power sources, connectors or any other relevant features (not shown). The imaging device 228 may capture imaging data in the form of one or more still or moving images of any kind or form, as well as any relevant audio signals or other information during the operation of the aerial vehicle 210.

The imaging device 228 may be mounted, fixed, embedded or otherwise joined to one or more external surfaces of the aerial vehicle 210 in any manner and in any orientation or alignment to capture imaging data from above the aerial vehicle 210. For example, the imaging device 228 may be coupled to any form of support system or structure for maintaining the lenses or other optical elements of the imaging device 228 at a selected orientation or configuration. Alternatively, the imaging device 228 may be mounted, fixed, embedded or otherwise joined to external surfaces of the aerial vehicle 210 in any other manner.

The imaging device 228 may communicate with the processor 212 and/or the control system 220, or with one another, by way of a wired or wireless connection that may be dedicated or comprise all or part of an internal network (not shown), e.g., an internal communications bus. Additionally, the imaging device 228 may be adapted or otherwise configured to communicate with the data processing system 280 by way of the network 290. The imaging device 228 may be of any type or form in accordance with the present disclosure, including but not limited to one or more digital cameras, depth sensors or range cameras, infrared cameras, radiographic cameras or other optical sensors.

In addition to the altimeter 224, the position sensor 226 and the imaging device 228, the aerial vehicle 210 may also include any number of other sensors, components or other features for controlling or aiding in the operation of the aerial vehicle 210, including but not limited to one or more environmental or operational sensors for determining one or more attributes of an environment in which the aerial vehicle 210 is operating, or may be expected to operate, including extrinsic information or data or intrinsic information or data. For example, the aerial vehicle 210 may include one or more acoustic sensors or other devices, components, systems or instruments for capturing and/or interpreting acoustic energy, including but not limited to one or more microphones (e.g., a transducer such as a dynamic microphone, a condenser microphone, a ribbon microphone or a crystal microphone) that are configured to convert acoustic energy of any intensity and across any or all frequencies into one or more electrical signals. Such acoustic sensors may be mounted to or distributed throughout an airframe or other structure of the aerial vehicle 210 and may include any number of diaphragms, magnets, coils, plates, or other like features for detecting and recording such energy, piezoelectric sensors (e.g., sensors configured to convert changes in pressure to electrical signals, including one or more crystals, electrodes or other features), or vibration sensors. The aerial vehicle 210 may further include one or more compasses, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude indicators, depth gauges, accelerometers, or other sensors.

Although the block diagram of FIG. 2 includes a single box for an aerial vehicle 210, a single box for a propulsion motor 222, a single box for an altimeter 224, a single box for a position sensor 226, and a single box for an imaging device 228, those of ordinary skill in the pertinent arts will recognize that the system 200 may include any number or type of aerial vehicles, propulsion motors, altimeters, position sensors, imaging devices or other sensors in accordance with the present disclosure.

The data processing system 280 includes one or more physical computer servers 282 having one or more computer processors 284 and any number of data stores 286 (e.g., databases) associated therewith, as well as provided for any specific or general purpose. For example, the data processing system 280 of FIG. 2 may be independently provided for the exclusive purpose of receiving, analyzing or storing information or data relating to geographic maps of one or more regions, locations or boundaries of one or more geospatial areas within such regions, population data covering such regions, locations of infrastructure within such regions, or any other factors. Alternatively, the data processing system 280 may be provided in connection with one or more physical or virtual services that are configured to receive, analyze or store such information or data, or other information or data, as well as one or more other functions. In some embodiments, the data processing system 280 of FIG. 2 may be configured to receive, analyze or store information or data relating to operations of the aerial vehicle 210, including positions (e.g., latitudes, longitudes and/or altitudes) of the aerial vehicle 210 at various times, or imaging data captured using the imaging device 228.

The data processing system 280 may be associated with one or more electronic marketplaces (e.g., online marketplaces), physical (e.g., bricks-and-mortar) marketplaces, fulfillment centers, materials handling facilities, warehouses, distribution centers, cross-docking facilities, order fulfillment facilities, packaging facilities, shipping facilities, rental facilities, libraries, retail stores or establishments, wholesale stores, museums, or any other facilities or systems. Alternatively, the data processing system 280 may be maintained separate and apart (e.g., independent) of or from any such facilities.

The servers 282 may be connected to or otherwise communicate with the processors 284 and the data stores 286, which may store any type of information or data, including but not limited to information or data regarding regions, geospatial areas within such regions, population data, paths or routes, infrastructure, or other information or data, as well as courses, speeds, altitudes, orientations, or operating characteristics of such aerial vehicles within such regions.

The servers 282 may be configured to execute one or more algorithms to generate one or more of the maps disclosed herein, including but not limited to geographic maps, population maps, reliability maps or others, or to determine routes or paths to be traveled by aerial vehicles based on such maps, in accordance with one or more search algorithms, or to generate modifications to such maps, routes or paths.

The servers 282 and/or the computer processors 284 may also connect to or otherwise communicate with the network 290 through the sending and receiving of digital data. For example, the data processing system 280 may include any facilities, stations or locations having the ability or capacity to receive and store information or data in one or more data stores, e.g., from the aerial vehicle 210, from one or more other aerial vehicles, or from one or more other external computer systems (not shown) via the network 290. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more aerial vehicles, including but not limited to the aerial vehicle 210.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other I/O interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

In some embodiments, the processor 212, the servers 282 and/or the processors 284 may be configured to execute one or more calculations regarding routes or paths to be traveled by the aerial vehicle 210, based on population data or other ground conditions within a vicinity of the aerial vehicle 210, or in a region where the aerial vehicle 210 is operating. In some embodiments, the processor 212, the servers 282 and/or the processors 284 may be configured to generate two-dimensional or three-dimensional models or other representations of population density or other data within one or more regions. In some embodiments, the processor 212, the servers 282 and/or the processors 284 may be configured to determine an optimal path or route between two locations for the execution of a given mission or task by the aerial vehicle 210 or one or more other aerial vehicles (not shown), such as according to any number of algorithms or techniques, including not only an A* search algorithm, but also one or more traditional shortest path or shortest route algorithms such as Dijkstra's Algorithm, Bellman-Ford Algorithm, Floyd-Warshall Algorithm, Johnson's Algorithm or a hub labeling technique. The processor 212, the servers 282 and/or the processors 284 may determine an optimal path or route based on any factor or element, or any other intrinsic or extrinsic factors.

In some embodiments, the processor 212 and/or the server 282 may be configured to execute one or more machine learning systems or techniques. For example, in some embodiments, an artificial neural network or other machine learning system or technique may be trained to receive inputs in the form of information or data regarding population densities within a region, and to generate paths or routes, or modifications to paths or routes, based on outputs generated in response to such inputs. In some other embodiments, the inputs may further include information or data regarding surface features, topography, or terrain features at the one or more locations. In accordance with the present disclosure, an artificial neural network or other machine learning system may be trained in a supervised or unsupervised manner, and may include any number of neurons in any number of layers, including an input layer, an output layer, and one or more intervening hidden layers. Each of the neurons in a layer within a neural network may receive an input and generate an output in accordance with an activation function, with parameters corresponding to the various strengths or synaptic weights, e.g., in the form of a sigmoid function, wherein an output thereof may have a range of zero to one or 0 to 1, a hyperbolic tangent function, wherein an output thereof may have a range of negative one to positive one, or −1 to +1, or any others. A machine learning system, such as an artificial neural network, may be further trained using any information, data or metadata in accordance with embodiments of the present disclosure.

The aerial vehicle 210 and/or the data processing system 280 may use any web-enabled or Internet applications or features, or any other client-server applications or features including E-mail or other messaging techniques, to connect to the network 290, or to communicate with one another. For example, the aerial vehicle 210 may be adapted to transmit information or data in the form of synchronous or asynchronous messages to the data processing system 280 or to any other computer device (e.g., to one or more other aerial vehicles) in real time or in near-real time, or in one or more offline processes, via the network 290. Those of ordinary skill in the pertinent art would recognize that the aerial vehicle 210 or the data processing system 280 may operate or be operated by any of a number of computing devices that are capable of communicating over the network, including but not limited to set-top boxes, mobile devices, laptop computers, desktop computers, smart speakers, electronic book readers, and the like. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the processor 212, the servers 282 and/or the processors 284, or any other computers or control systems utilized by the aerial vehicle 210 or the data processing system 280 (e.g., by one or more other aerial vehicles), and having sequences of instructions which, when executed by a processor (e.g., a CPU or GPU), cause the processor to perform all or a portion of the functions, services and/or methods described herein. Such computer-executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Any of the algorithms, techniques or functions described herein as being performed or executed by one or more of the processor 212, the memory 214, or the control system 220 of the aerial vehicle 210 may be performed or executed by one or more of the server 282, the processor 284 or the data store 286, or vice versa, e.g., by the sending and receiving of digital data over the network 290.

Figure 3:
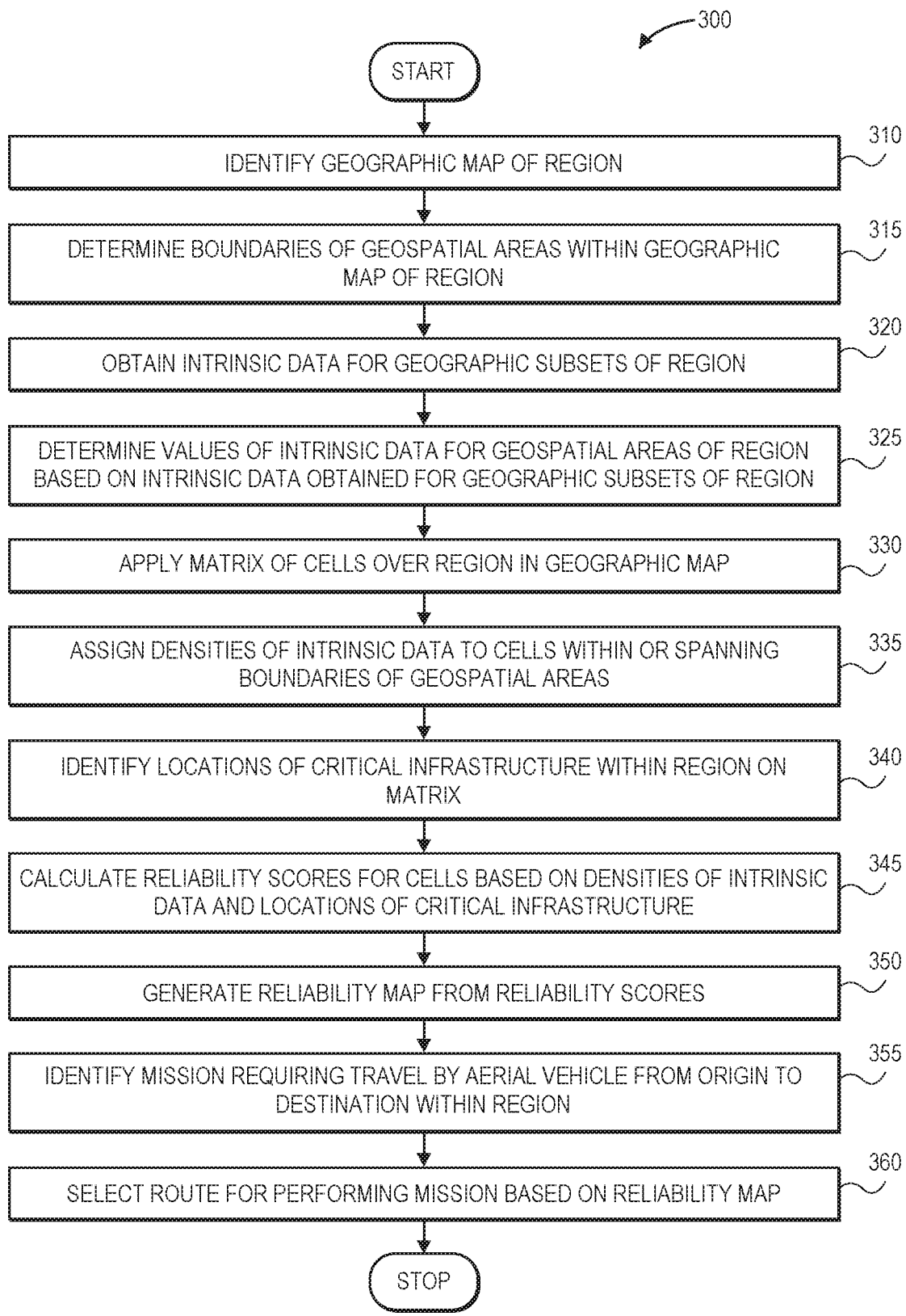
FIG. 3 is a flow chart of one process for selecting safe flight routes in accordance with embodiments of the present disclosure.

As is discussed above, the systems and methods of the present disclosure are directed to selecting safe paths or routes for travel by aerial vehicles during missions or other flight operations over a region based on population densities or other conditions on the ground. Referring to FIG. 3, a flow chart 300 of one process for selecting safe flight routes in accordance with embodiments of the present disclosure is shown. At box 310, a geographic map of a region is identified. The geographic map may depict any ground features within the region, including but not limited to natural features or elements such as land masses, plant life, or water courses but also artificial features or elements such as buildings (e.g., homes, offices, or other structures), transportation systems, or other components of infrastructure. The geographic map may take the form of a raster image, a vector image, or any other type or form of representation, and may have been previously generated based on images captured by airborne or space-based systems, based on geographic information system (or "GIS") data, or based on any other public or private information or data, either in real time or near-real time, or at any prior time.

At box 315, one or more boundaries (or borders of geospatial areas) within the geographic map of the region are identified. Such boundaries may be stored in association with the geographic map, e.g., as one or more layers of the geographic map, or obtained from any other source. The geospatial areas may include, but need not be limited to, formally defined (e.g., incorporated) tracts of land such as states, counties or municipalities, or portions thereof, as well as unincorporated land or informally defined areas such as neighborhoods, residential complexes, office facilities, stadiums, or others. Alternatively, the geospatial areas may include, but need not be limited to, other areas or spaces including those occupied by rivers, lakes, parks, roads, parking lots or systems, or any other areas or spaces.

At box 320, intrinsic data is obtained for geographic subsets of the region. In some embodiments, the intrinsic data may include population numbers or figures for the region or for one or more portions thereof, or any other numbers, figures or other data, and may be obtained from any public or private source. For example, in some embodiments, the intrinsic data may include one or more sets of population data for geographic subsets of a region that are maintained by the United States Department of Energy's Oak Ridge National Laboratory, viz., LandScan data, which includes population distribution data for areas having resolution defined by thirty second (or one half-minute) by thirty second (or one half-minute) geographic resolution, or by the University of Southampton, viz., WorldPop data. Alternatively, the intrinsic data may be obtained from any other source, and the geographic subsets may have any other size.

For example, the intrinsic data may include population data that is determined or estimated for one or more geographic subsets of a region based on human-associated emissions or transmissions from one or more devices within such subsets, e.g., cellular telephone transmissions of any type or form. Furthermore, the intrinsic data may be appropriate and accurate for the geographic subsets of the region only for finite or predefined time periods, and may be irrelevant or inaccurate for the geographic subsets of the region during other time periods. For example, the intrinsic data may include population data for the region prior to, during or after business hours, or on weekends. Alternatively, the intrinsic data may include population data for the region that is appropriate and accurate during special events or occurrences, which may be scheduled or unscheduled, and defined on any basis.

Any type or form of data may be determined or obtained from any source or in any manner and utilized in accordance with embodiments of the present disclosure. Moreover, sizes of the geographic subsets of the region that are associated with the intrinsic data may be equal to, or greater than or less than, sizes of any of the geospatial areas included in the geographic map of the region identified at box 310, and for which boundaries were determined at box 315. Alternatively, the geographic subsets of the region may have a unit size, or may otherwise bear no relation to any of the geospatial areas for which the boundaries were determined at box 315.

At box 325, values of the intrinsic data are determined for the geospatial areas within the geographic map of the region based on the intrinsic data obtained for the geographic subsets of the region at box 320. For example, where a population density or other density of units of a geographic subset of a region is obtained at box 320, the population density or other density may be multiplied by an area of the geographic subset to determine a population or other number of units for the geographic subset. Alternatively, where the values of the intrinsic data obtained at box 320 are expressed not in densities but in units, a number of the units identified as being associated with a given geographic subset may be assigned to that geographic subset. Values of the intrinsic data regarding the geographic subsets of the region may be assigned to respective ones of the geographic subsets of the region on any basis in accordance with embodiments of the present disclosure.

At box 330, a matrix of cells is applied over the region in the geographic map. The matrix of cells may have any size or shape, and defined on any basis. For example, in some embodiments, each of the cells may have a minimum size and a corresponding shape of a minimum corridor or space (e.g., an operating area) required for safe operation of an aerial vehicle, subject to one or more general (or objective) requirements, or to one or more specific (or subjective) requirements of the region, or of a given aerial vehicle. The matrix may represent any tessellation of the region, and the cells may have shapes of squares (or other rectangles), triangles, pentagons, hexagons, octagons, or other polygons.

In some embodiments, each of the cells may have one or more lines that is parallel to a line of longitude or a line of latitude.

In some embodiments, the cells may have a size corresponding to an area of impact or operating area of the aerial vehicle, which may be selected as a function of operating characteristics of the aerial vehicle. For example, the area of impact or operating area may be determined as a function of the aerial vehicle's planned or actual altitude, the aerial vehicle's mass, or the aerial vehicle's velocity, or any other factors, such as estimated drag that will be imparted upon surfaces of the aerial vehicle during flight, an estimated air speed or straight-line velocity, an estimated angular velocity, a temperature (or other measure of density) of the air in which the aerial vehicle travels, a surface area of the aerial vehicle with respect to its principal axes (e.g., vertical or yaw, lateral or pitch, or longitudinal or roll), as well as a mass of the aerial vehicle.

At box 335, densities of the intrinsic data are assigned to cells of the matrix that are within or span boundaries of the geospatial areas of the region. For example, a population density of a cell of the matrix may be assumed to be equal to a population density of a geospatial area (e.g., a state, a county, a city or a town, as well as a river, a lake, a park, a road, or a highway) in which the cell is fully encompassed. Alternatively, where a cell of the matrix spans two or more geospatial areas, a population density assigned to the cell may be determined by averaging, blending or otherwise allocating population densities of any number of the geospatial areas on any basis, such as by identifying comparative levels or values of concentrations or densities of adjoining or nearby geospatial areas, or on any other basis.

At box 340, locations of critical infrastructure are identified within the region on the matrix. For example, where geolocations of high-value or high-risk parcels or facilities such as schools, hospitals, public safety facilities or military installations are known, such geolocations may be identified within the matrix either with respect to the specific locations of such parcels or facilities, or with respect to the cells of the matrix corresponding to zones in which such parcels or facilities are located.

At box 345, reliability scores are calculated for cells based on the densities of the intrinsic data assigned to such cells at box 335 and the locations of the critical infrastructure identified within the region at box 340. In some embodiments, the reliability scores may be, or may be based on, population densities of the corresponding cells determined either on a static basis, or as a function of time, such as when populations and/or densities of such cells are known to vary over time. In some other embodiments, however, the reliability scores may indicate a reliability factor for each of the cells, which may be calculated based on the corresponding population densities of such cells and the locations of the critical infrastructure, and, alternatively, any other information or data regarding such cells. For example, the reliability scores may be calculated as a function of the population density and any area of impact or operating area, which may itself be predicted or determined dynamically, along with one or more safety factors or considerations. Any basis for determining a reliability score for any of the cells may be utilized in generating the reliability map in accordance with the present disclosure. In some embodiments, travel over or near a cell having one or more of the locations of critical infrastructure may be determined to be inherently unreliable under any circumstances, such that the cells may not be considered for inclusion in any route or path generated based on such scores. Alternatively, in some embodiments, the cells may have a predetermined qualitative or quantitative reliability score assigned thereto based on the critical infrastructure therein, such that the cells may be considered for inclusion in any route or path generated based on such scores, to the extent that the route or path has a sufficiently low level of risk, or a sufficiently high level of reliability, as compared to other routes or paths that do not include such cells. Cells that neighbor cells including critical infrastructure may be deemed impassible or blocked, or may be deemed passible or considered, independent of whether the cells including critical infrastructure are likewise deemed impassible or blocked, or passible or considered.

For example, in some embodiments, a cell having a school may have the same reliability score as a cell having a hospital or other government institution. Alternatively, a cell having a school may have a reliability score that is different from a reliability score of a cell having a hospital, a reliability score of a cell having a courthouse, a reliability score of a cell having a police station, a reliability score of a cell having a sports arena, or any other cells.

At box 350, a reliability map is generated from the reliability scores calculated at box 345. In some embodiments, the reliability map may cover or correspond to all of the land area of the geographic map of the region identified at box 310. Alternatively, in some other embodiments, the reliability map may cover or correspond to more or less land area than that which is depicted within the geographic map of the region identified at box 310.

At box 355, a mission requiring travel by an aerial vehicle from an origin within the region to a destination within the region is identified. The mission may be associated with the performance of any functions or tasks, including but not limited to a delivery of one or more items to the destination, a monitoring operation occurring within the region, or a response to an issue affecting public or private safety within the region, or any other functions or tasks. At box 360, a route for performing the mission is selected based on the reliability map, and the process ends. For example, the route may be selected to maximize a reliability score for the route, or to minimize an unreliability score for the route, or in any other manner or on any other basis. In some embodiments, the route may be selected according to a search algorithm, e.g., an A* search algorithm, or any other path or route planning algorithm. Alternatively, the route may be selected to specifically travel over specific cells that are identified or selected based on the reliability map, or to specifically avoid specific cells that are identified or selected based on the reliability map.

As is discussed above, a reliability map of a region may be formed by determining densities of population or any other intrinsic data of geospatial areas in any manner. A grid (or array) having a plurality of cells with common shapes (e.g., triangles, rectangles, pentagons, hexagons, octagons, or others) and sizes is applied to the densities, and such densities may be assigned to cells of the grid, where appropriate. Similarly, locations of critical infrastructure such as schools, hospitals or public safety buildings may be determined, and the reliability map may be formed from the grid with cells having values corresponding to population densities and/or annotations of locations of the critical infrastructure. The reliability map may be used to select a safe route for travel between two locations within the region, including from one zone corresponding to a cell including an origin and another zone corresponding to a cell including a destination.

Referring to FIGS. 4A through 4I, views of aspects of systems for selecting safe flight routes in accordance with embodiments of the present disclosure are shown. Except where otherwise noted, reference numerals preceded by the number "4" shown in FIGS. 4A through 4I indicate components or features that are similar to components or features having reference numerals preceded by the number "2" shown in FIG. 2 or by the number "1" shown in FIGS. 1A through IF.

Figure 4A:
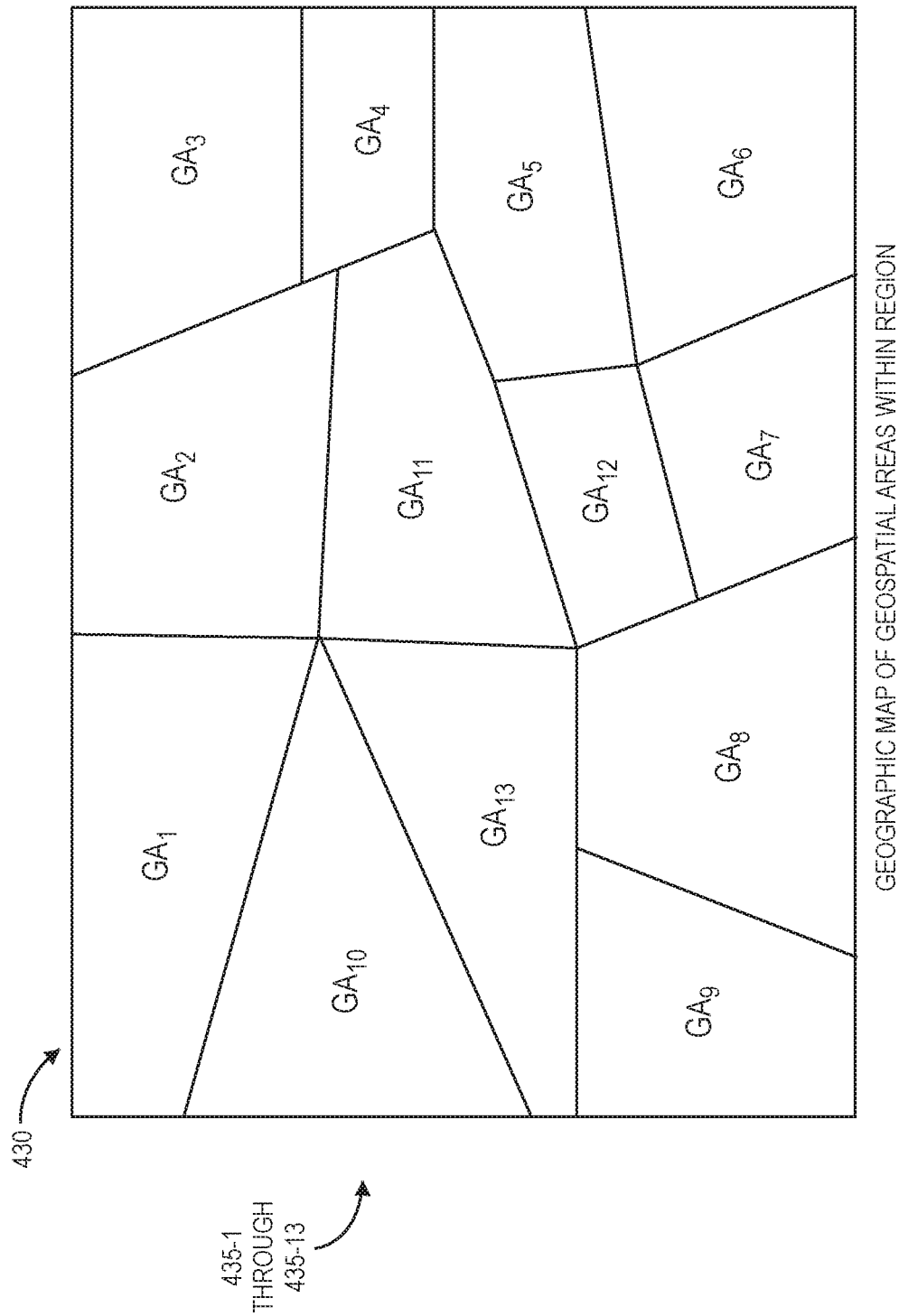

As is shown in FIG. 4A, a geographic map 430 depicts a plurality of geospatial areas 435-1 through 435-13, or $GA_1$ through $GA_{13}$. Each of the geospatial areas 435-1 through 435-13 may include one or more formally or informally established tracts of land such as states, counties or municipalities, or portions thereof, as well as unincorporated land or informally defined areas such as neighborhoods, residential complexes, office facilities, stadiums, or others. The region may likewise be a collection of any number of the geospatial areas 435-1 through 435-13, or other geospatial areas (not shown). The geographic map 430 depicts formal or informal boundaries existing between the respective geospatial areas 435-1 through 435-13 and may be established to any scale.

Figure 4B:
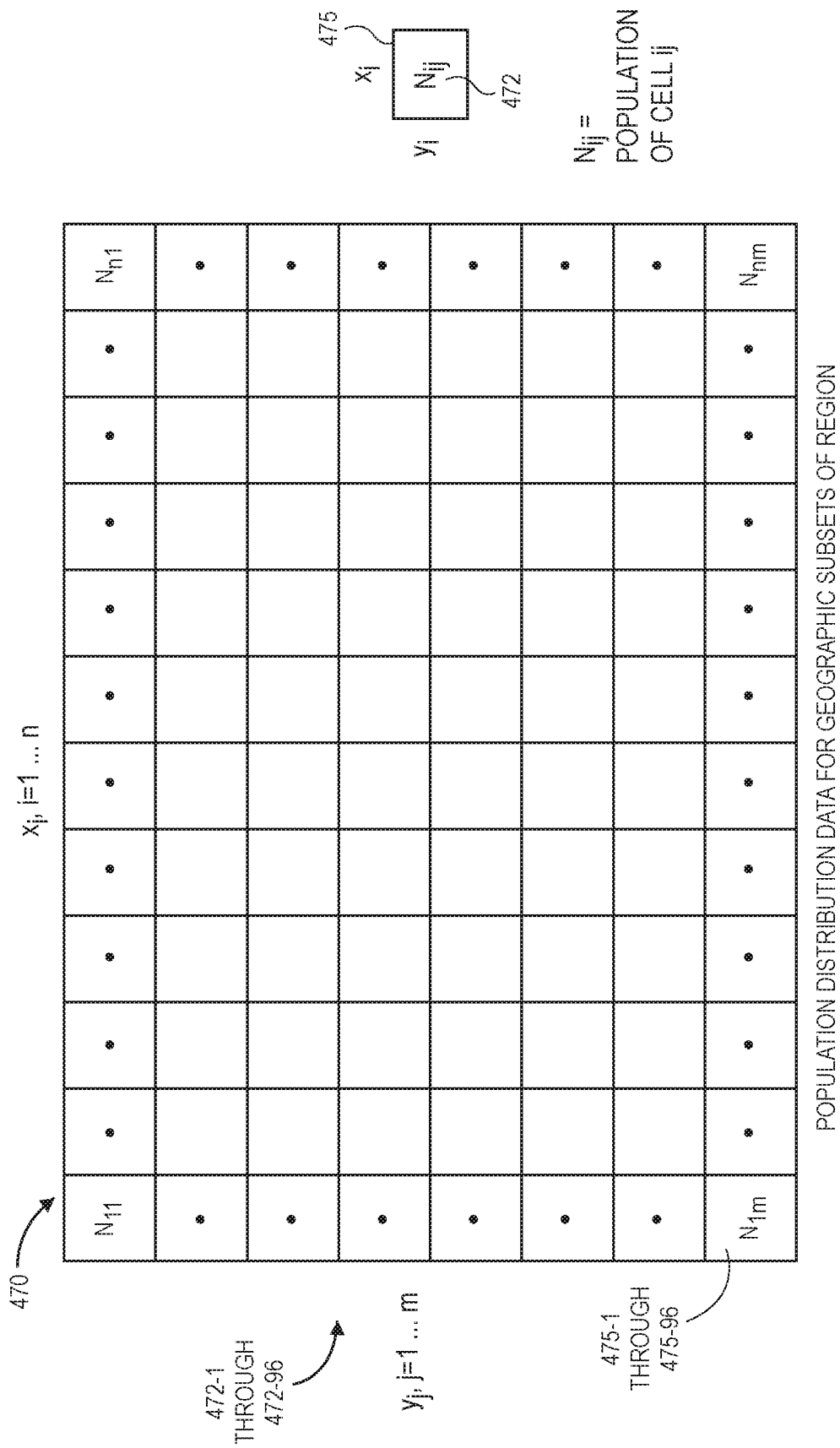

As is shown in FIG. 4B, a grid or array 470 of population distribution data 472-1 through 472-96 is identified for the region shown in the geographic map 430 of FIG. 4A. The grid 470 has m columns and n rows of cells 475-1 through 475-96 or other tessellations or sections, and includes the population distribution data 472-1 through 472-96 distributed across the plurality of cells 475-1 through 475-96, or $N_{ij}$ for each cell i, j. In some embodiments, the population distribution data 472-1 through 472-96 may include LandScan data maintained by the United States Department of Energy's Oak Ridge National Laboratory, and each of the plurality of cells 475-1 through 475-96 may have dimensions of thirty latitude seconds (or one latitude half-minute) by thirty longitude seconds (or one longitude half-minute), or approximately or 0.575 miles latitude (or 0.925 kilometers latitude) by 0.440 miles latitude (0.710 kilometers longitude) at the Earth's fortieth parallel (40°). geographic resolution. Alternatively, the population distribution data 472-1 through 472-96 may include WorldPop data maintained by the University of Southampton. In some other embodiments, population data obtained from any source may be identified as associated with the geographic map 430 and utilized in accordance with embodiments of the present disclosure, however. For example, the cells 475-1 through 475-96 or other geographic subsets may have any size or shape, e.g., a regular or irregular polygon such as a triangle, a rectangle, a pentagon, a hexagon, an octagon, or others, with respect to the geospatial areas 435-1 through 435-13.

Figure 4C:
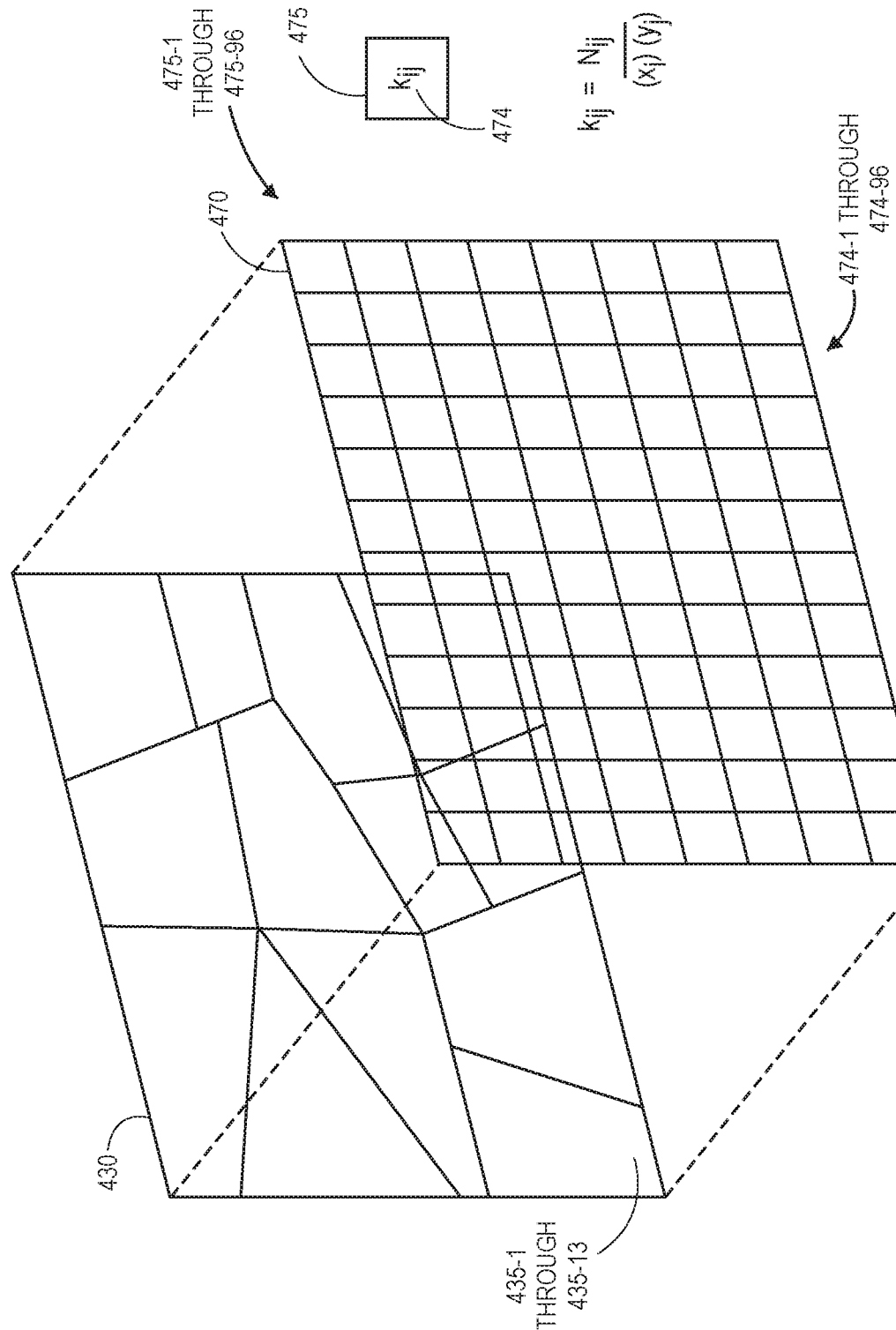

As is shown in FIG. 4C, population densities 474-1 through 474-96, or $k_{ij}$, are calculated for each of the cells 475-1 through 475-96, by dividing the population distribution data 472-1 through 472-96 shown in FIG. 4B by areas of the respective cells 475-1 through 475-96, or by dividing $N_{ij}$ for each of the cells by a product of the width $x_i$ and the height $y_j$ of the cells 475-1 through 475-96.

Figure 4D:
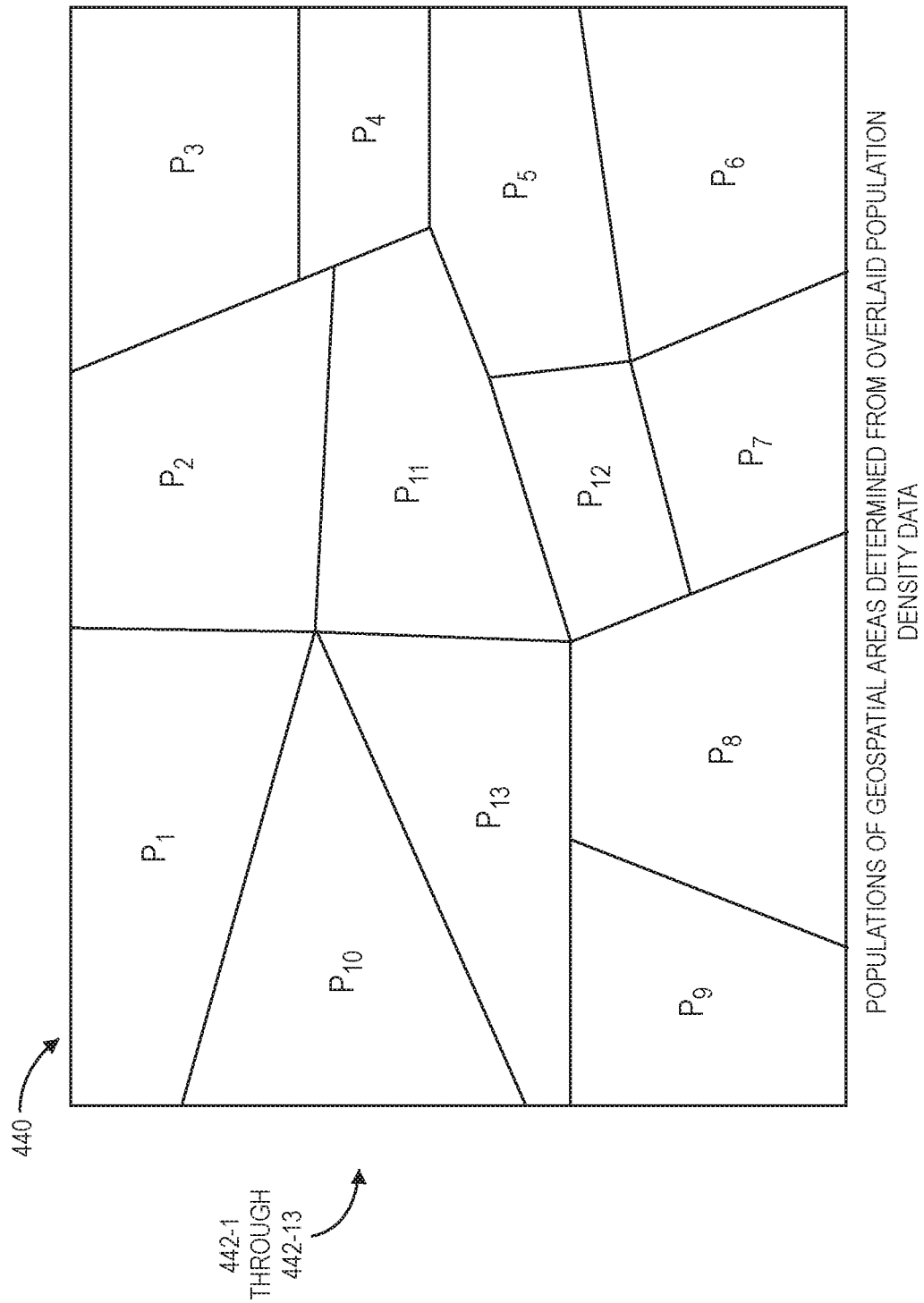

As is shown in FIG. 4D, a population map 440 depicting populations 442-1 through 442-13, or $P_1$ through $P_{13}$, of the geospatial areas 435-1 through 435-13 is generated from the application of the population densities 474-1 through 474-96 of the cells 475-1 through 475-96 to the geographic map 430. Where two or more of the geospatial areas 435-1 through 435-13 share common cells, population data (e.g., the $N_{ij}$ of such cells) or population densities of such cells (e.g., the $k_{ij}$ of such cells) may be assigned to corresponding ones of the geospatial areas 435-1 through 435-13 in any manner, e.g., equally, proportionally, or on any other basis.

For example, in some embodiments, where a cell spanning two of the geospatial areas 435-1 through 435-13 has 500 persons, the population of the cell may be assigned equally to the two of the geospatial areas 435-1 through 435-13, or 250 persons to each of such geospatial areas. In some other embodiments, where sixty percent of the cell lies in a first one of the geospatial areas 435-1 through 435-13 and forty percent of the cell lies in a second one of the geospatial areas 435-1 through 435-13, however, 300 of the persons may be assigned to the first one of the geospatial areas 435-1 through 435-13, and 200 of the persons may be assigned to the second one of the geospatial areas 435-1 through 435-13.

Furthermore, when population data is determined for the geospatial areas 435-1 through 435-13, and information or data regarding specific locations of the population within such geospatial areas 435-1 through 435-13 is determined, e.g., such as locations of homes, zoning regulations, lot density or other data, a new boundary may be virtually assigned to virtually subdivide one or more of the geospatial areas 435-1 through 435-13, and the population of the one or more of the geospatial areas 435-1 through 435-13 may be assigned to subdivisions on either side of the boundary. Any new boundaries that are virtually constructed need not bear any relation to any physical characteristics of the geospatial areas 435-1 through 435-13, however.

Figure 4E:
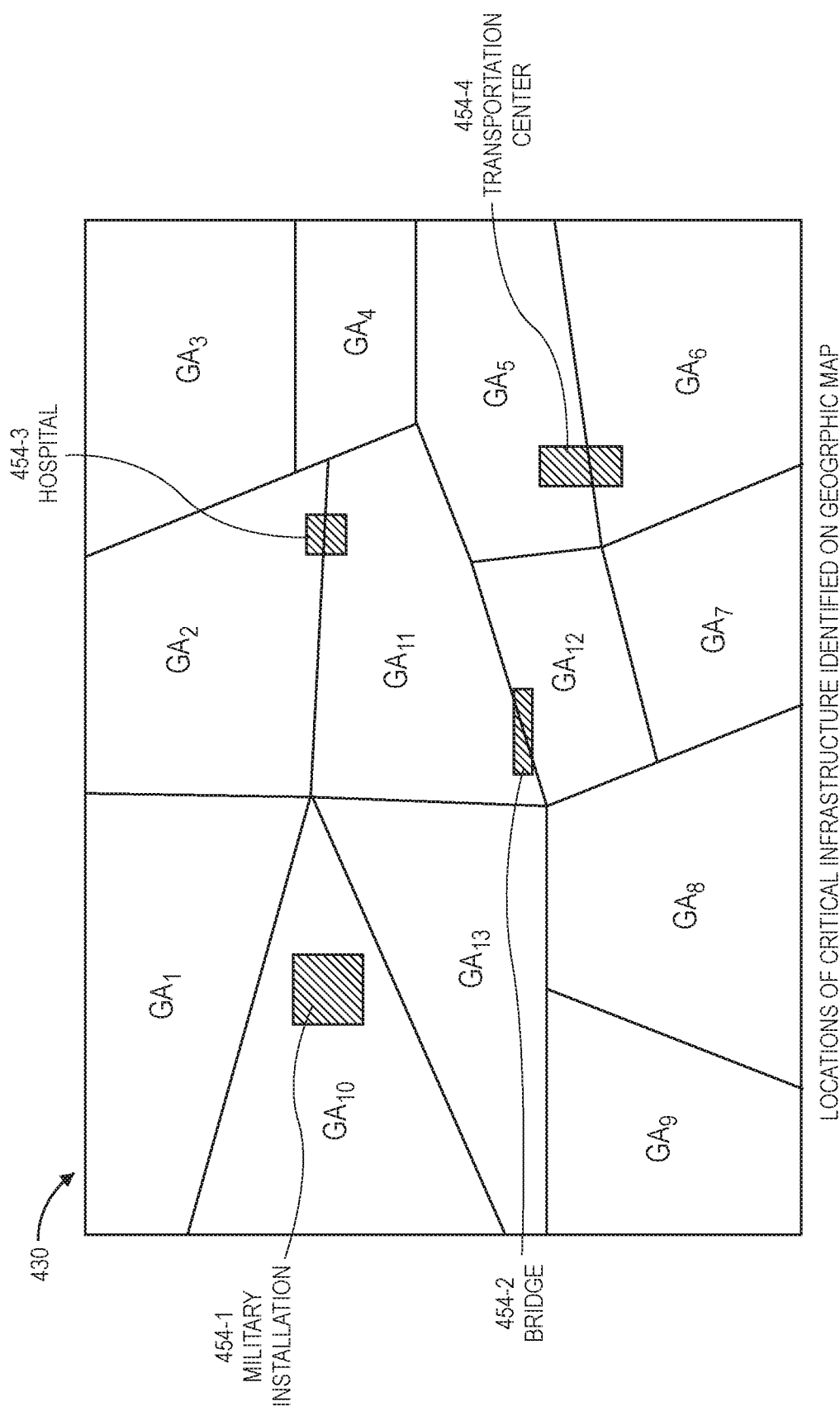

Additionally, locations of infrastructure within the region shown in the geographic map 430 may be identified and used to construct a reliability map. As is shown in FIG. 4E, a military installation 454-1 is located within a portion of the geospatial area 435-10, or $GA_{10}$, while a bridge 454-2 spans the geospatial area 435-11 and the geospatial area 435-12, or $GA_{11}$ and $GA_{12}$. A hospital 454-3 spans the geospatial area 435-2 and the geospatial area 435-11, or $GA_2$ and $GA_{11}$, and a transportation center 454-4 spans the geospatial area 435-5 and the geospatial area 435-6, or $GA_5$ and $GA_6$.

Figure 4F:
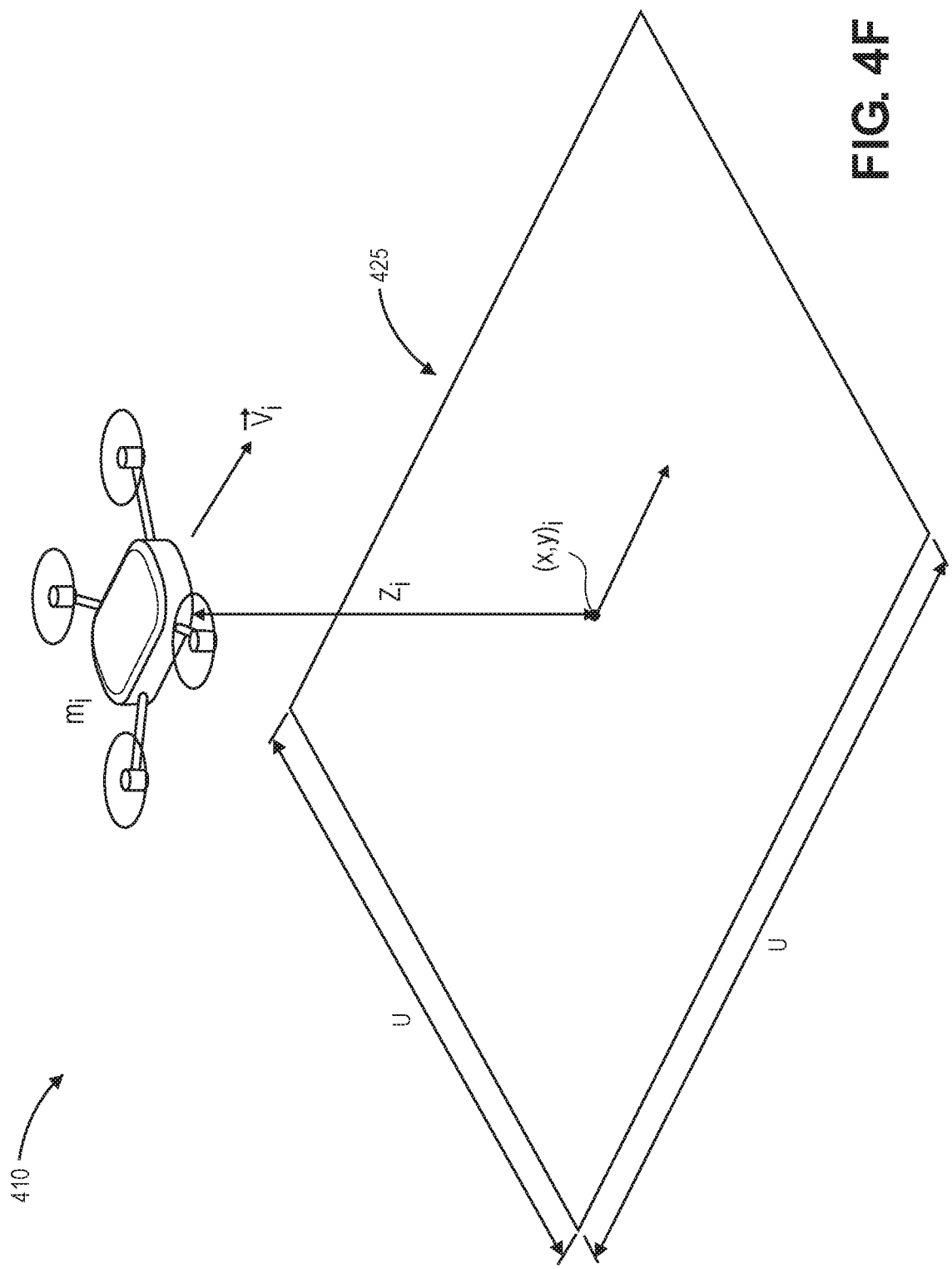

As is shown in FIG. 4F, an operating area 425 may be defined for an aerial vehicle 410 within the region shown in the geographic map 430. In some embodiments, the area 425 may be a square having dimensions U×U, which may be selected on any attributes of the operation of the aerial vehicle 410, including but not limited to a position $(x, y)_i$ of the aerial vehicle 410, an altitude $Z_i$ of the aerial vehicle 410, a mass $m_i$ of the aerial vehicle 410, a velocity $V_i$ of the aerial vehicle 410, or any other intrinsic or extrinsic factors, such as payloads carried by the aerial vehicle 410, attributes of a mission being performed by the aerial vehicle 410, or any other factor.

Figure 4G:
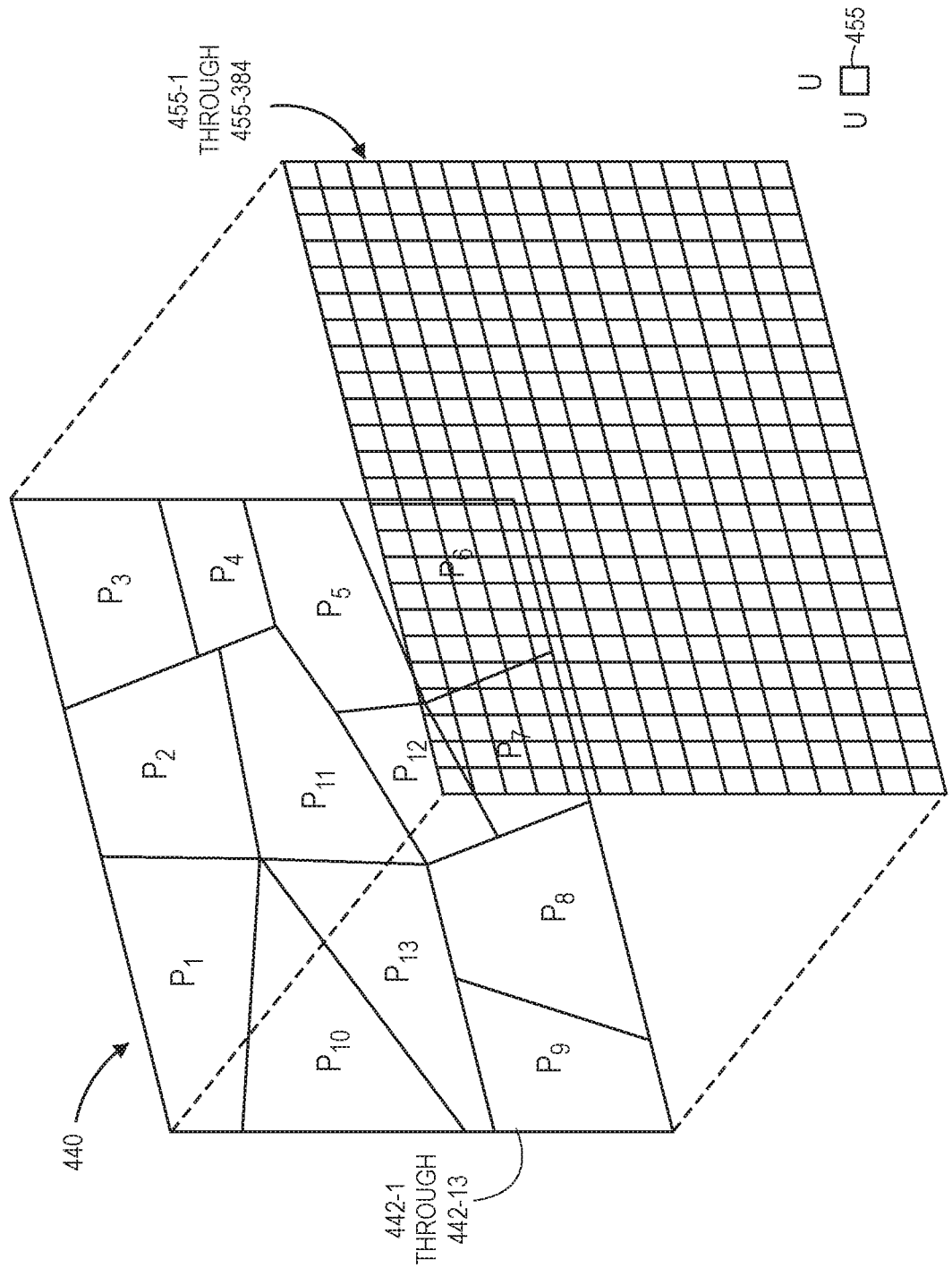

As is shown in FIG. 4G, a grid having a plurality of cells 455-1 through 455-384 is generated and overlaid onto the population map 440. Each of the cells 455 may have a size and/or shape corresponding to the operating area 425 defined in FIG. 4F. Population densities corresponding to each of the cells 455-1 through 455-384 may be determined by apportioning the populations 442-1 through 442-13 of the respective geospatial areas 435-1 through 435-13 with respect to the cells 455, or in any other manner.

As is shown in FIG. 4H, a reliability map 450 is generated based on the population densities corresponding to each of the cells 455-1 through 455-384. For example, as is shown in FIG. 4H, the reliability map 450 may include qualitative or quantitative markings or indicators for each of the cells 455-1 through 455-384 that indicate a reliability score for the cells 455-1 through 455-384. For example, the respective reliability scores may be calculated based on the population densities corresponding to each of the cells 455-1 through 455-384, as well as the locations of the military installation 454-1, the bridge 454-2, the hospital 454-3 and the transportation center 454-4.

The reliability map 450 may be utilized for any purpose, including but not limited to determining a route or path between two locations within the region. In some embodiments, the cells including the locations of the military installation 454-1, the bridge 454-2, the hospital 454-3 and the transportation center 454-4 may be deemed impassible under any circumstances, and a search algorithm may block such cells, or fail to consider such cells, in generating any route or path. Alternatively, in some other embodiments, the cells including the locations of the military installation 454-1, the bridge 454-2, the hospital 454-3 and the transportation center 454-4 may be assigned artificially high levels of intrinsic data, such as population densities, as compared to cells that do not include any critical infrastructure, in order to increase the costs associated with travel over zones corresponding to cells. Therefore, a search algorithm may still consider such cells (or neighboring cells) in generating routes or paths, and may include one or more of the cells in a route or path to the extent that the route or path has a sufficiently low level of risk, or a sufficiently high level of reliability, as compared to other routes or paths that do not include such cells (or the neighboring cells).

Figure 4I:
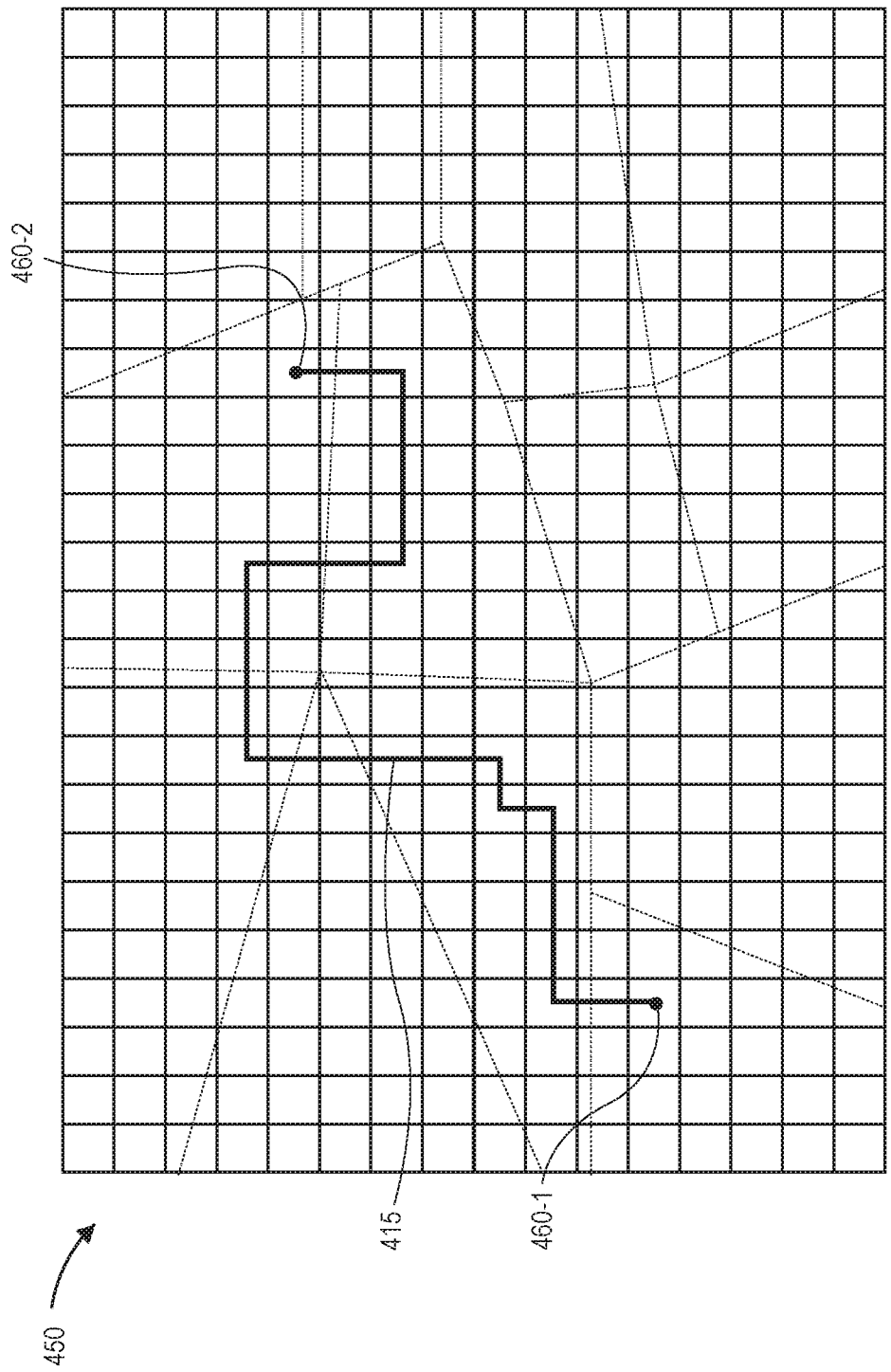

As is shown in FIG. 4I, a route 415 from an origin 460-1 to a destination 460-2 is determined based on the reliability map 450. The route 415 passes through centroids of a series of the cells 455-1 through 455-384 in any of four directions (e.g., vertically up, vertically down, horizontally left or horizontally right) or, alternatively, in any of eight directions (e.g., vertically up, vertically down, horizontally left or horizontally right, as well as any diagonals between vertical and horizontal directions). Additionally, the route 415 and the cells 455-1 through 455-384 that may be selected on any basis, including the respective population densities of the cells 455-1 through 455-384, or on any other basis. For example, a search algorithm or a cost algorithm that considers distances of the various cells of the reliability map 450 to the origin 460-1, as well as the reliability scores or population densities of the respective cells and also of neighboring cells, may be utilized to select the route 415.

Figure 5A:
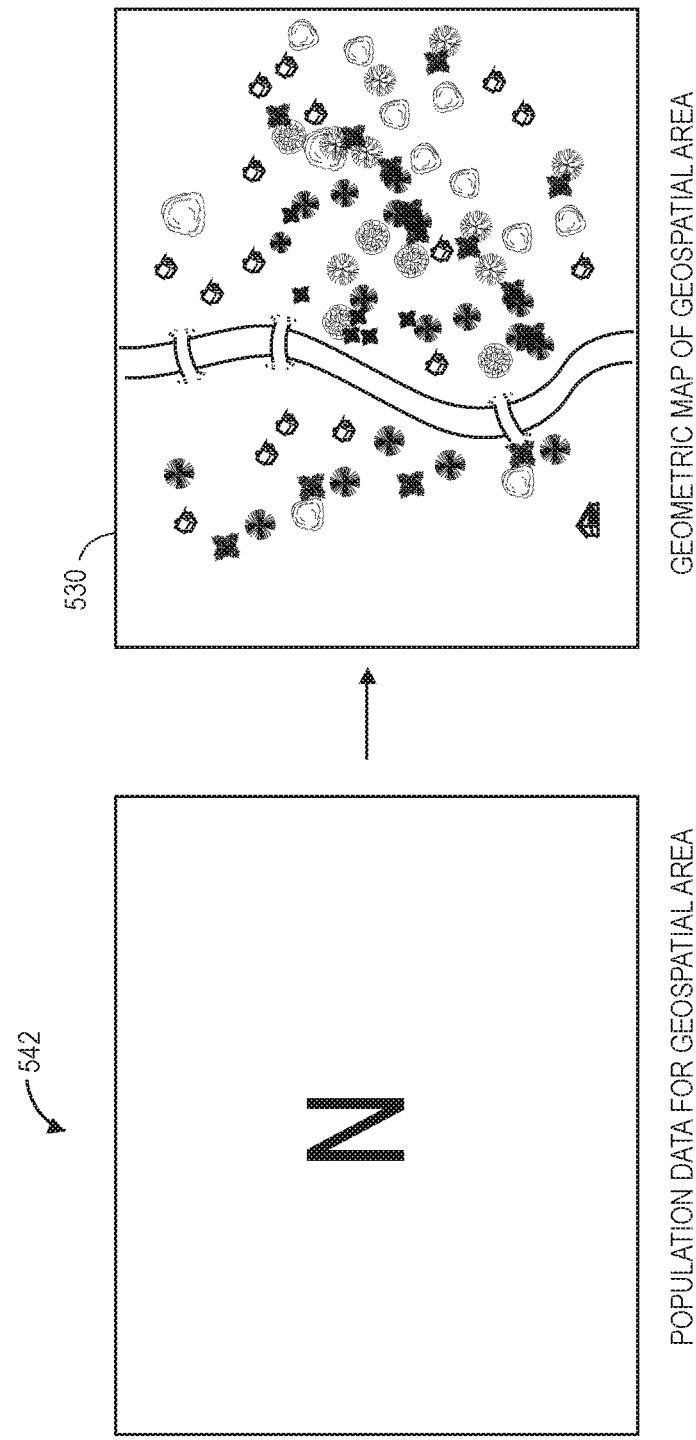
FIGS. 5A through 5C are views of aspects of systems for selecting safe flight routes in accordance with embodiments of the present disclosure.
Figure 5B:
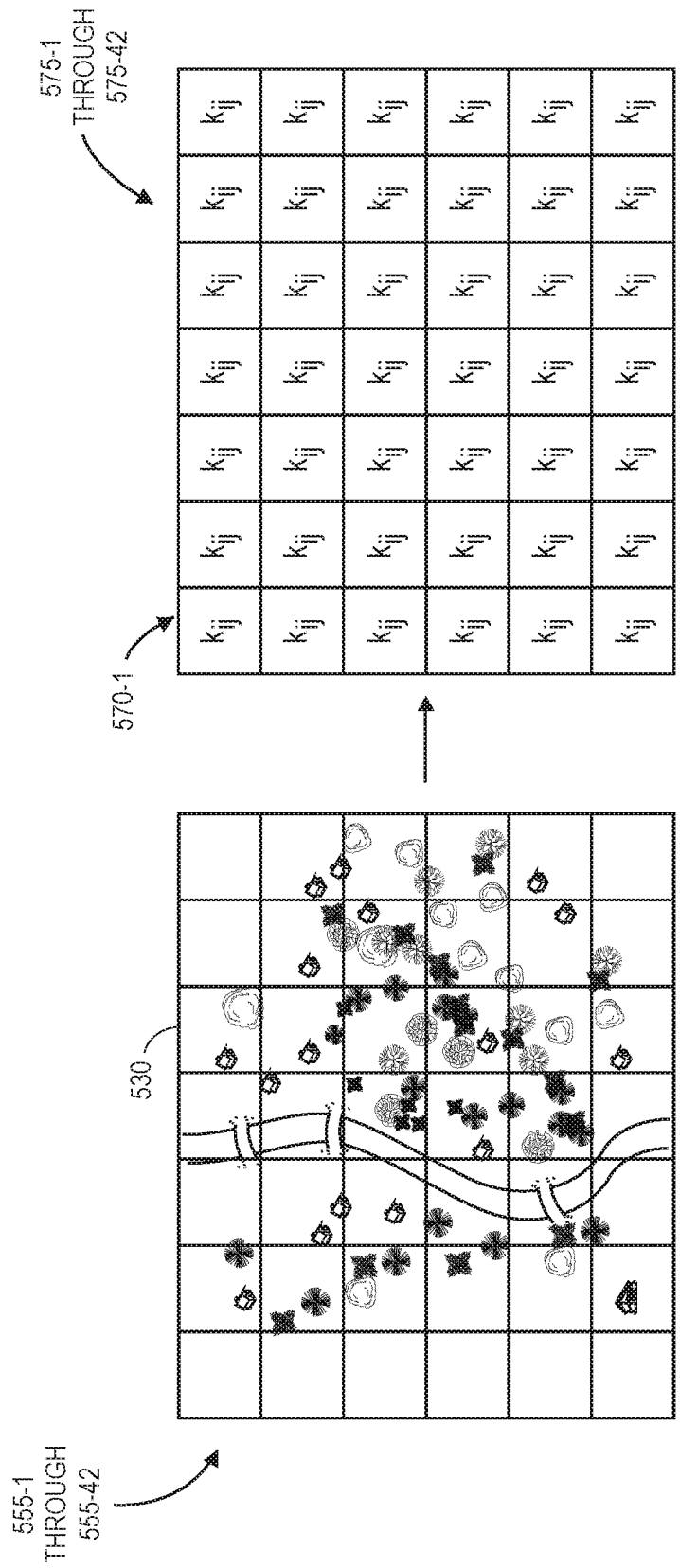
Figure 5B:
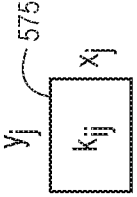
Figure 5C:
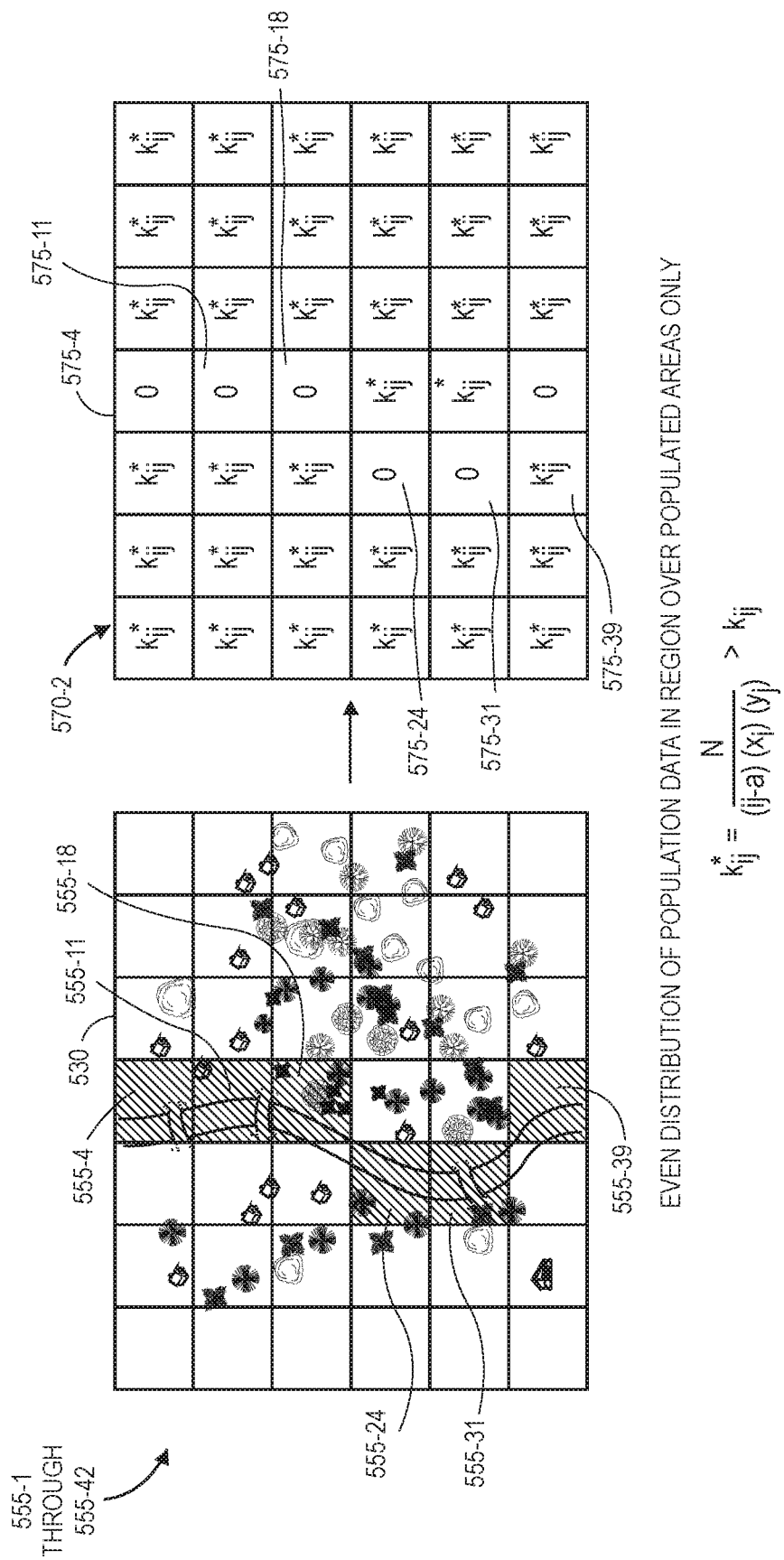

As is discussed above, where intrinsic data (e.g., population data) is known for a geospatial area, the intrinsic data may be uniformly applied to the geospatial area, e.g., by assuming that a geospatial area has a constant population density defined by population data and a land area of the geospatial area. Alternatively, where aspects of a distribution of intrinsic data (e.g., population data) throughout a geospatial area are known, such as where locations of particularly high or particularly low concentrations are discernible, a density of the intrinsic data within the geospatial area may be modified accordingly in order to ensure that an accurate account of density within the geospatial area is known and considered in identifying one or more safe routes over the geospatial area. Referring to FIGS. 5A through 5C, views of aspects of systems for selecting safe flight routes in accordance with embodiments of the present disclosure are shown. Except where otherwise noted, reference numerals preceded by the number "5" shown in FIGS. 5A through 5C indicate components or features that are similar to components or features having reference numerals preceded by the number "4" shown in FIGS. 4A through 4I, by the number "2" shown in FIG. 2 or by the number "1" shown in FIGS. 1A through 1F.

As is shown in FIG. 5A, a geospatial area has a population data 542 indicating a population of N within the geospatial area. A geographic map 530 of the geospatial area depicts a river passing through the geospatial area.

As is shown in FIG. 5B, in accordance with some embodiments of the present disclosure, the population N of the geospatial area may be assumed to be uniform across the geospatial area. Thus, as is shown in FIG. 5B, a population density distribution 570-1 for the geospatial area may be determined by dividing the population map 530 of the geospatial area into a plurality of cells, e.g., cells 555-1 through 555-42, and assuming that each of the cells or other subsets of the geospatial area has an equal population density. For example, as is shown in FIG. 5B, each of the cells 555-1 through 555-42 may be presumed to have a population density of $k_{ij}$, where $k_{ij}$ equals the population N of the geospatial area divided by a number of the cells, e.g., a product of i and j, or 42, and an area of each of the cells 555-1 through 555-42, or a product of a width $x_i$ and a height $y_j$ of each of the cells 555-1 through 555-42. The population density distribution 570-1 thus includes population densities 575-1 through 575-42 for each of such cells 555-1 through 555-42.

Alternatively, where information or data is known or may be determined regarding population densities of respective ones of the cells 555-1 through 555-42, different population densities may be calculated for each of such cells. For example, information or data may indicate the temporary or permanent presence or absence of persons within one or more of the cells 555-1 through 555-42, and respective population densities may be calculated for each of such cells 555-1 through 555-42 accordingly. For example, as is shown in FIG. 5C, because each of the cells 555-4, 555-11, 555-18, 555-24, 555-31, 555-39 is partially or entirely includes a river or other unpopulated area, such cells may be presumed to have low or zero populations. Therefore, a population density distribution 570-2 for the geospatial area may be determined based on the presumption that the cells 555-4, 555-11, 555-18, 555-24, 555-31, 555-39 have low or zero populations, and that the entire population N is assigned to portions of the geospatial area other than those corresponding to the cells 555-4, 555-11, 555-18, 555-24, 555-31, 555-39. The population density distribution 570-2 presumes that the cells other than the cells 555-4, 555-11, 555-18, 555-24, 555-31, 555-39 each has a population density of $k^*_{ij}$, where $k^*_{ij}$ equals the population N of the geospatial area divided by a number of the cells other than the cells 555-4, 555-11, 555-18, 555-24, 555-31, 555-39, viz., a product of i and j minus six, or 36, and an area of each of the cells, or a product of a width $x_i$ and a height $y_j$ of each of the cells. The population density $k^*_{ij}$ calculated by excluding the cells 555-4, 555-11, 555-18, 555-24, 555-31, 555-39 is thus greater than the population density $k_{ij}$ calculated by including the cells 555-4, 555-11, 555-18, 555-24, 555-31, 555-39, as shown in FIG. 5B, i.e., where the population N is presumed to be evenly distributed across the geospatial area.

Alternatively, population densities (or densities of other intrinsic data) may be calculated or presumed based on any other information or data, including but not limited to locations of homes, zoning regulations, lot densities or others, and a reliability map may be generated based any such population densities (or densities of other intrinsic data).

As is discussed above, a reliability map of a region may be generated based on population data or other intrinsic data that varies based on not only locations within the region but also dates or times, as well as regularly scheduled or cyclic events, or irregularly occurring or unexpected events. Referring to FIGS. 6A through 6D, views of aspects of systems for selecting safe flight routes in accordance with embodiments of the present disclosure are shown. Except where otherwise noted, reference numerals preceded by the number "6" shown in FIGS. 6A through 6D indicate components or features that are similar to components or features having reference numerals preceded by the number "5" shown in FIGS. 5A through 5C, by the number "4" shown in FIGS. 4A through 4I, by the number "2" shown in FIG. 2 or by the number "1" shown in FIGS. 1A through 1F.

Figure 6A:
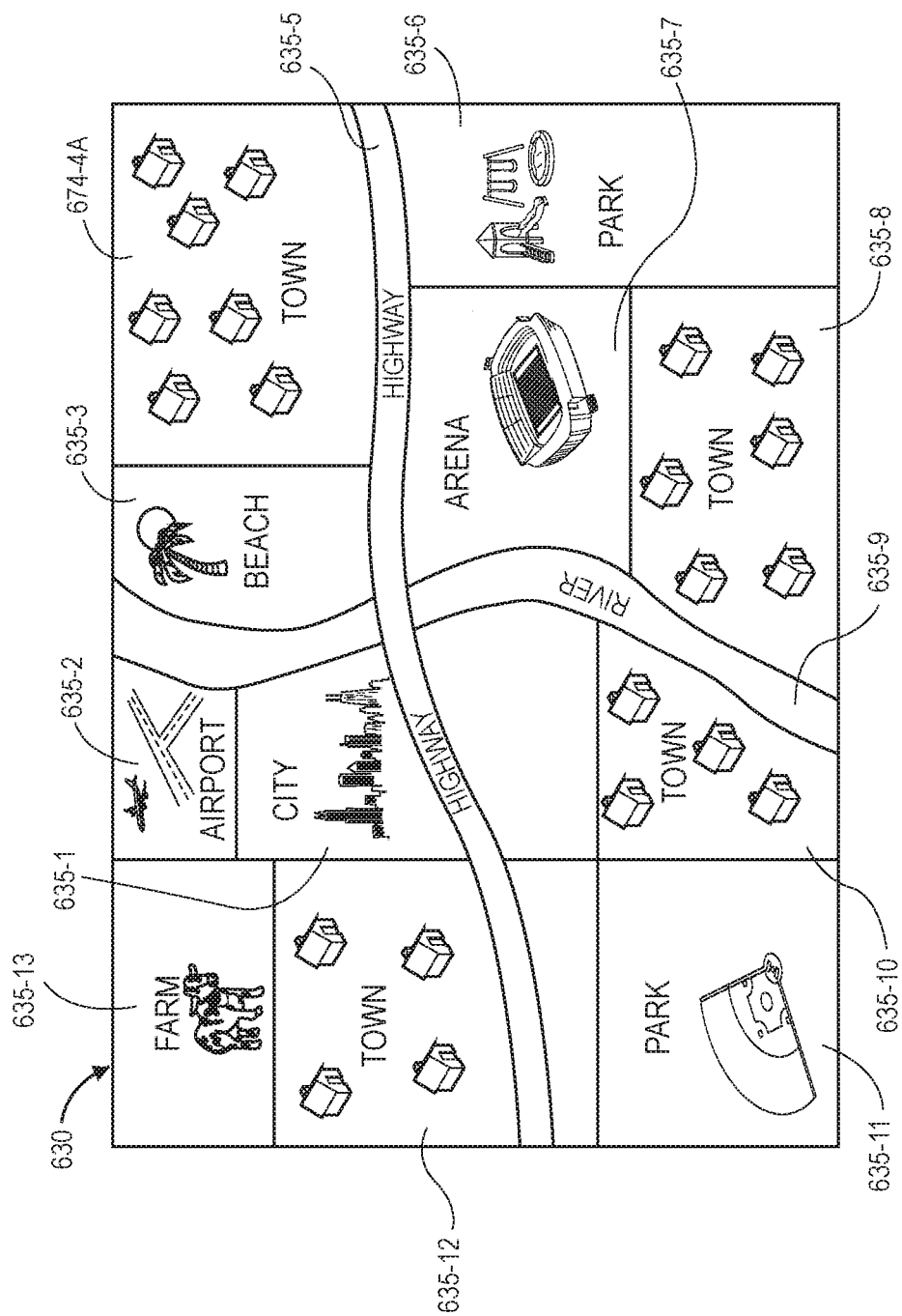

As is shown in FIG. 6A, a geographic map 630 of a region identifies thirteen geospatial areas 635-1 through 635-13, including but not limited to a city 635-1, an airport 635-2, a beach 635-3, a town 635-4, a highway 635-5, a park 635-6, a stadium 635-7, a town 635-8, a river 635-9, a town 635-10, a park 635-11, a town 635-12 and a farm 635-13.

Figure 6B:
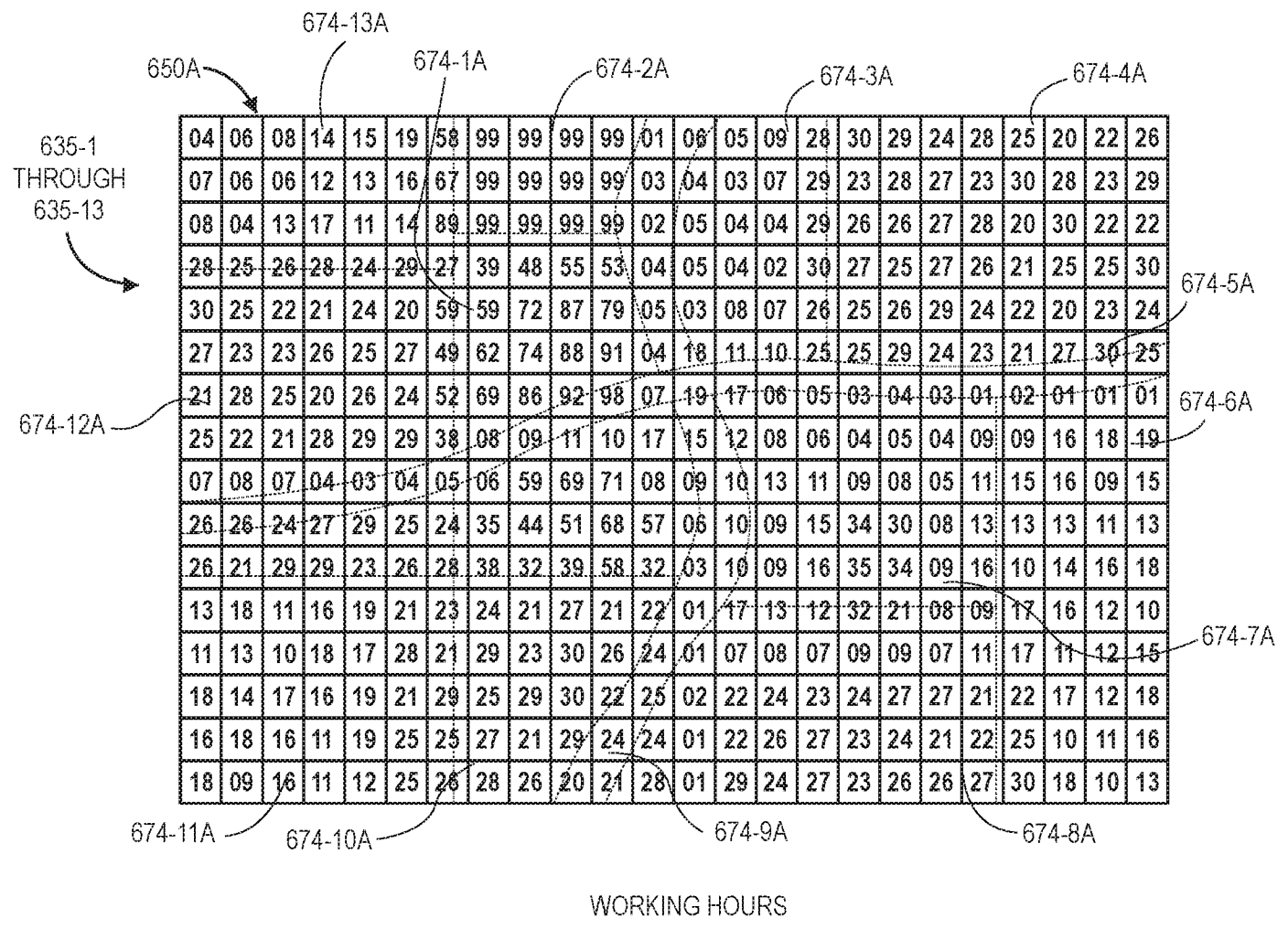

The region depicted within the geographic map 630 may be subject to variations in actual or predicted population densities or other intrinsic data at various times or on various days, and a reliability map may be calculated for such times or days based on the variations. As is shown in FIG. 6B, a reliability map 650A includes sets of reliability scores for each of the geospatial areas 635-1 through 635-13 shown in the geographic map 630 during working hours, e.g., between approximately 8 o'clock a.m. and approximately 5 o'clock p.m. on a weekday. For example, reliability scores 674-1A corresponding to a vicinity of the city 635-1 are substantially elevated, due to the high concentration of workers at office buildings or other facilities there during the working hours. Reliability scores 674-2A corresponding to the airport 635-2 are very high, due to the status of the airport 635-2 as critical infrastructure, such that a cost associated with travel over the airport 635-2 is comparatively high. Reliability scores 674-3A, 674-6A, 674-11A corresponding to the beach 635-3 and the parks 635-6, 635-11 are very low, due to the fact that beaches and parks are not frequented by large numbers of people during working hours, while reliability scores 674-4A, 674-8A, 674-10A, 674-12A corresponding to the towns 635-4, 635-8, 635-10, 635-12 are comparatively low during the working hours, as a result of many adults attending to work, e.g., in the city 635-1 or elsewhere, and with children in school. Reliability scores 674-5A, 674-9A, 674-13A corresponding to the highway 635-5 and the river 635-9, which do not have resident populations, and the farm 635-13, which has an extremely low population density, are significantly lower than reliability scores of other geospatial areas. Finally, reliability scores 674-7A corresponding to the stadium 635-7 are also comparatively low, given that events such as sporting events or concerts are not frequently scheduled during the working hours, and the population densities in and around the stadium 635-7 are comparatively low.

Figure 6C:
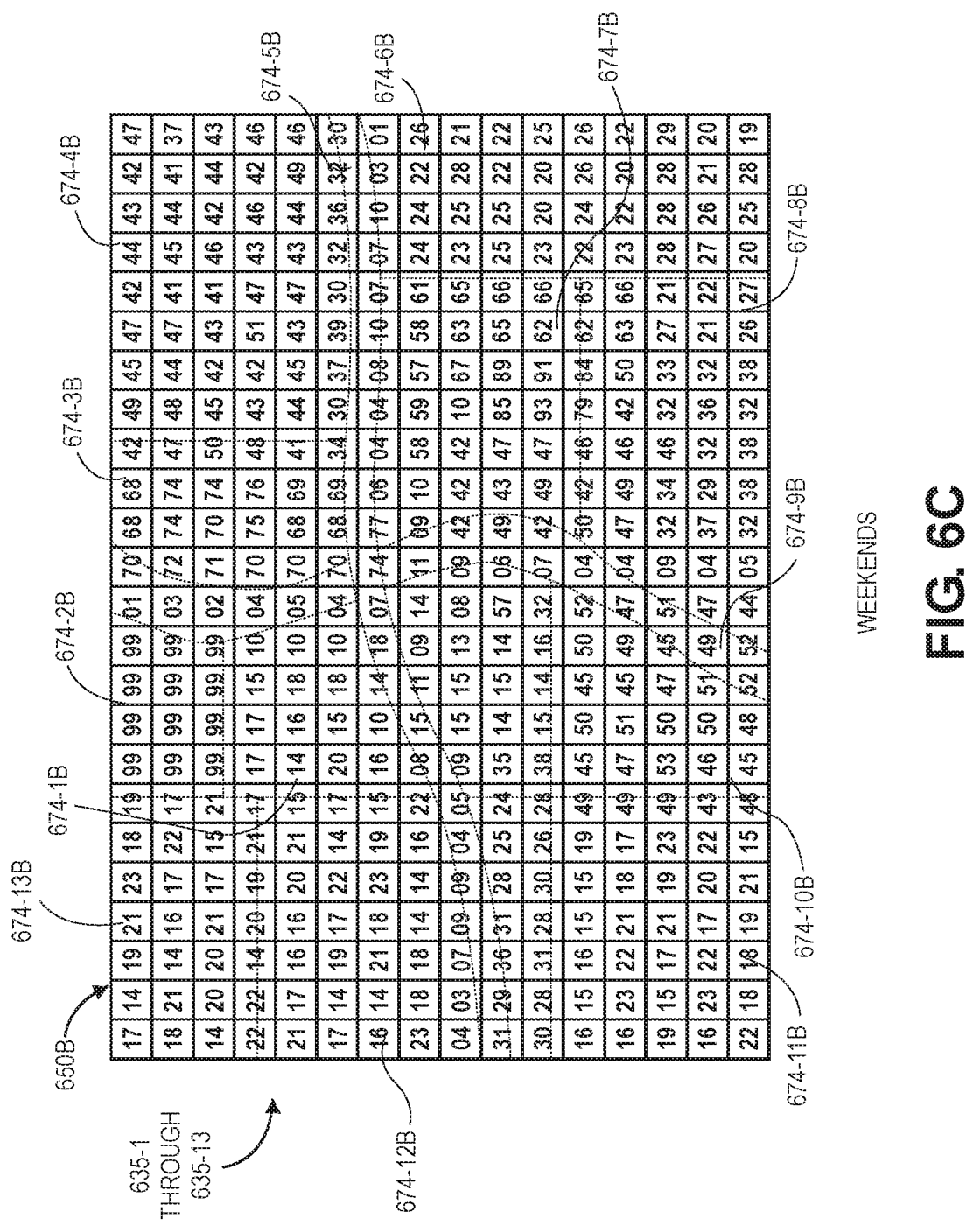

Different population densities are observed within the geospatial areas 635-1 through 635-13 at times other than during the working hours. As is shown in FIG. 6C, a reliability map 650B includes sets of reliability scores for each of the geospatial areas 635-1 through 635-13 shown in the geographic map 630 on a weekend, e.g., a Saturday or a Sunday, or on a holiday. For example, the reliability scores 674-1B for the city 635-1 are significantly lower on the weekend than during the working hours, as shown in FIG. 6B, due to the inherently lower concentration of workers at office buildings or other facilities on weekends. Likewise, the reliability scores 674-2B for the airport 635-2 remain high, due to the status of the airport 635-2 as critical infrastructure, while the reliability scores 674-3B, 674-6B, 674-11B corresponding to the beach 635-3 and the parks 635-6, 635-11 are significantly higher on the weekend than during the working hours, as shown in FIG. 6B, due to the fact that beaches and parks are commonly frequented by large numbers of people on weekends.

As is also shown in FIG. 6C, reliability scores 674-4B, 674-8B, 674-10B, 674-12B corresponding to the towns 635-4, 635-8, 635-10, 635-12 are higher on weekends than during the working hours, with many adults home from work and many children home from school. Reliability scores 674-5B, 674-9B, 674-13B corresponding to the highway 635-5, the river 635-9 and the farm 635-13 remain low, while reliability scores 674-7B corresponding to the stadium 635-7 are significantly higher, given that events such as sporting events or concerts are commonly held in facilities such as the stadium 635-7 on weekends.

Figure 6D:
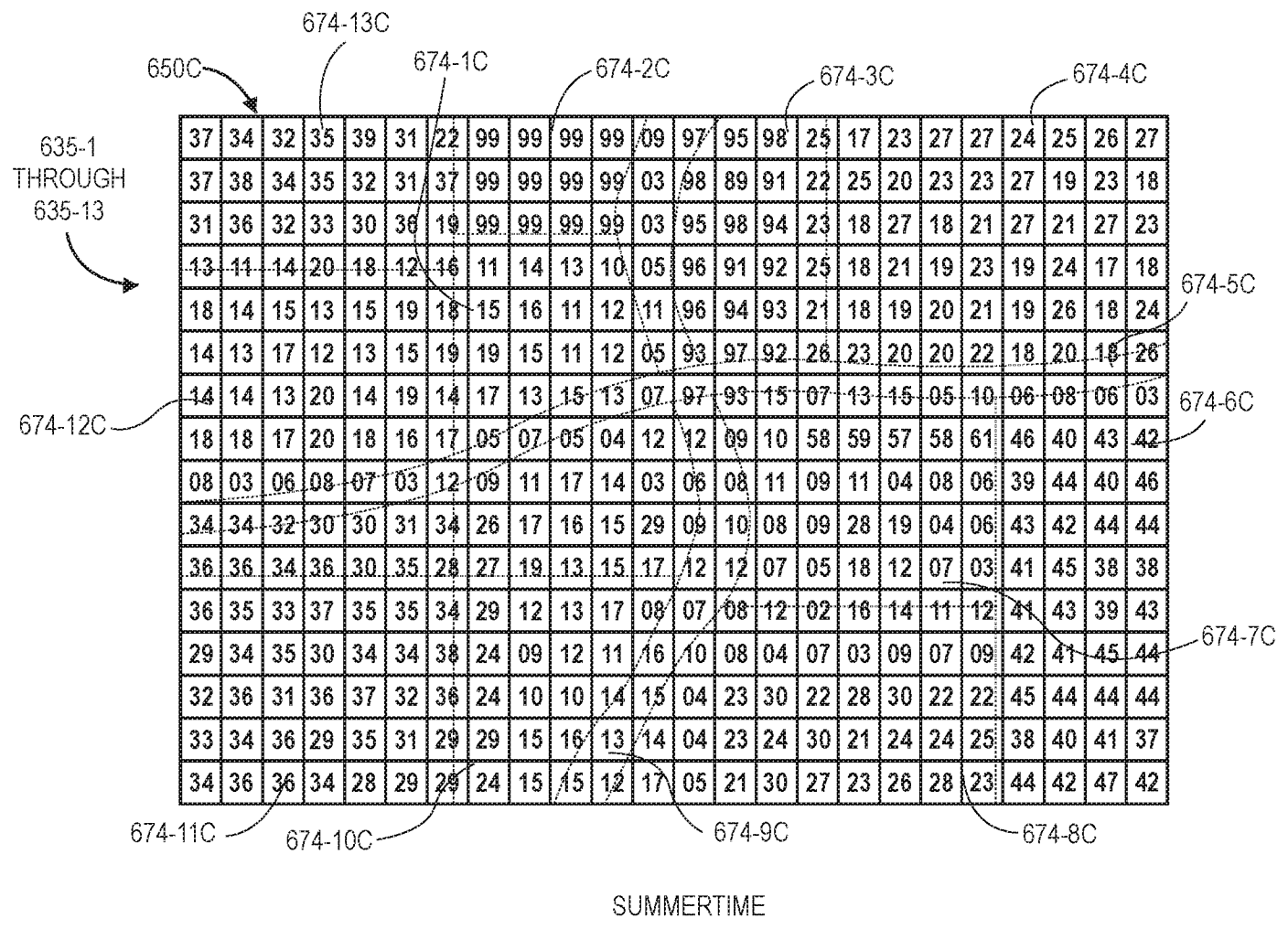

Similarly, as is shown in FIG. 6D, a reliability map 650C includes sets of reliability scores for each of the geospatial areas 635-1 through 635-13 shown in the geographic map 630 during the summertime. For example, the reliability scores 674-1C for the city 635-1 are lower during the summertime than during traditional working hours, as shown in FIG. 6B, due to the fact that many workers take vacations during the summer months. Likewise, the reliability scores 674-2C for the airport 635-2 remain high, due to the status of the airport 635-2 as critical infrastructure, while the reliability scores 674-3C, 674-6C, 674-11C corresponding to the beach 635-3 and the parks 635-6, 635-11 are higher than during the working hours, as shown in FIG. 6B, and similar to the weekend, as shown in FIG. 6C, due to the fact that beaches and parks are also commonly frequented by large numbers of people during the summer months.

As is also shown in FIG. 6D, reliability scores 674-4C, 674-8C, 674-10C, 674-12C corresponding to the towns 635-4, 635-8, 635-10, 635-12 are higher during the summertime than during the working hours, but lower than on weekends, with many families taking vacations during the summer months. Reliability scores 674-5C, 674-9C, 674-13C corresponding to the highway 635-5, the river 635-9 and the farm 635-13 remain low, while reliability scores 674-7C corresponding to the stadium 635-7 are also low, if one or more sporting events or concerts that are commonly held in facilities such as the stadium 635-7 are not scheduled during the summertime.

Any of the reliability maps 650A, 650B, 650C shown in FIGS. 6B through 6D may be utilized in selecting a route or a path for one or more aerial vehicles to travel between two or more locations throughout the region shown in the geographic map 630 at corresponding times (e.g., during working hours, on weekends or during the summertime).

Figure 7:
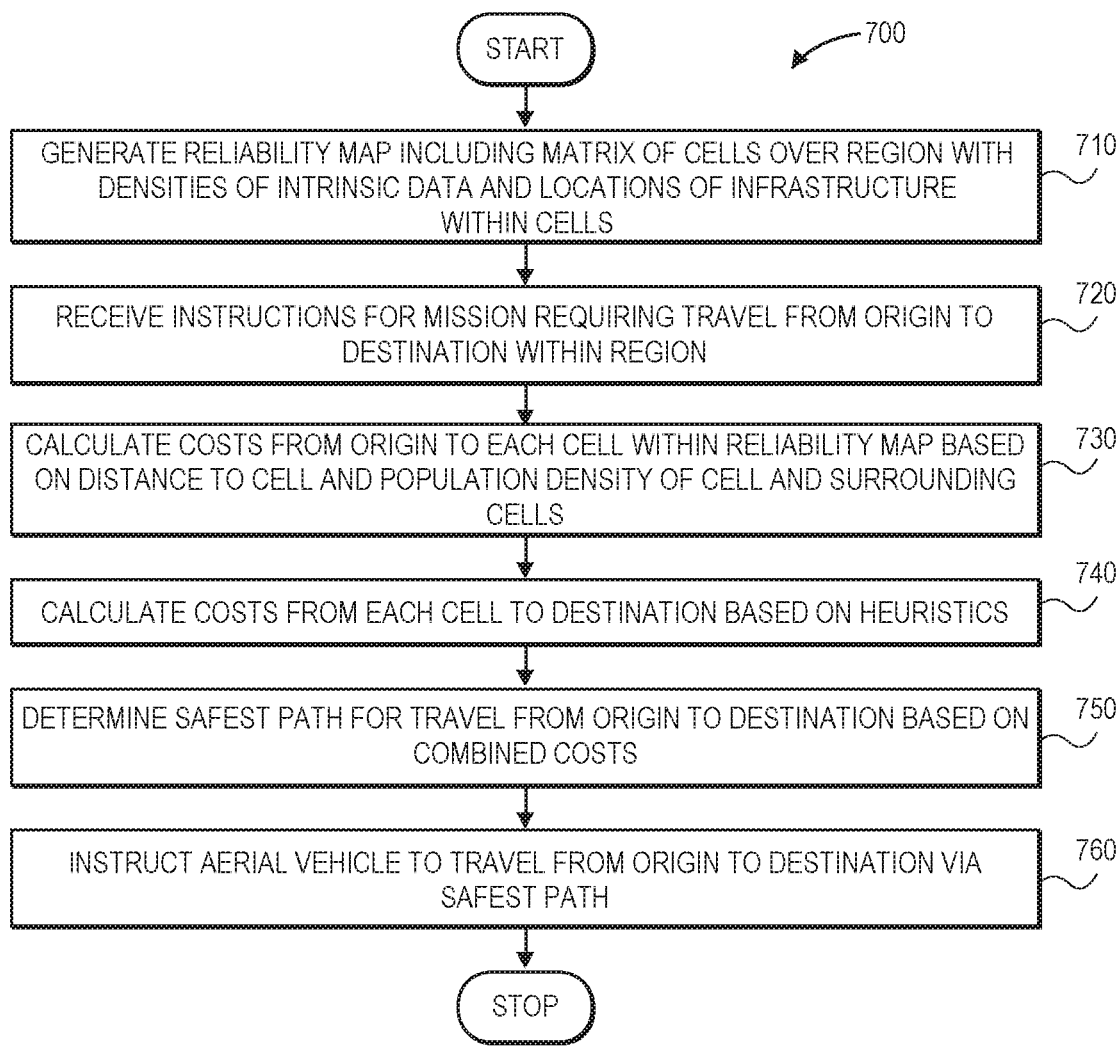
FIG. 7 is a flow chart of one process for selecting safe flight routes in accordance with embodiments of the present disclosure.

As is discussed above, a safe flight route may be selected using a search algorithm, or a cost minimization algorithm, that considers population densities or other conditions on ground locations, and avoids areas of particularly high levels or risk. Referring to FIG. 7, a flow chart 700 of one process for selecting safe flight routes in accordance with embodiments of the present disclosure is shown. At box 710, a reliability map including a matrix of cells provided over a geographic map of a region and including densities of intrinsic data (e.g., population data) and locations of critical infrastructure is generated. For example, the reliability map may represent population densities in cells of any size or shape, e.g., regular or irregular polygons such as triangles, rectangles, pentagons, hexagons or octagons, and indicate whether such cells correspond to zones of a geospatial area that include the locations of the critical infrastructure. The reliability map may be constructed from geographic maps and population data or other intrinsic data identified from any public or private source, in any manner. The reliability map may be generated by one or more computer systems or devices in any location, including but not limited to a physical location within the region or elsewhere, a virtual location such as a "cloud"-based data processing system, or aboard one or more aerial vehicles.

At box 720, instructions associated with a mission requiring travel from an origin to a destination within a region covered by the reliability map are received. For example, the mission may involve a delivery of one or more items to the destination, a monitoring operation occurring within the region, a response to an issue affecting public or private safety within the region, or any other functions or tasks to be performed within the region by an aerial vehicle.

At box 730, costs for traveling from the origin to locations within each cell of the reliability map are calculated based on distances from the origin to such cells and population densities of the cells and surrounding cells. For example, in some embodiments, the costs may be calculated according to a search algorithm, or a cost minimization algorithm, that considers costs not only in an economic sense, but also in a logistical or functional sense that takes into account a level of risk for traveling between any two of the cells of the reliability map, or any other factor. In some embodiments, a cost may be calculated as a function of a distance from an origin to any given cell (or a distance between any two of the cells), as well as a population density of the given cell, and the population densities of neighboring cells. For example, a cost of traveling from an origin to a first cell may be calculated as a sum of the distance to be traveled from the origin to the first cell, the population density of the first cell, and an average of the population densities of N cells that surround or are adjacent to the first cell. In some embodiments, the cost may be calculated based not only on population densities but also locations of critical infrastructure, which may be deemed impassible under any circumstances, or not considered, in generating any route or path. Alternatively, in some other embodiments, the cost may be considered by assigning high levels of intrinsic data, such as population densities, to cells including locations of critical infrastructure, as compared to cells that do not include any critical infrastructure.

At box 740, costs for traveling from each of the cells to the destination are determined based on heuristics. For example, according to some search algorithms, or cost minimization algorithms, the costs for traveling between any pair of cells (e.g., between each of the cells and the destination) may be determined as a sum of the Manhattan distances, or the horizontal or vertical distances between the cells of the pair. Alternatively, according to some other search algorithms or cost minimization algorithms, the costs for traveling between any pair of cells (e.g., between each of the cells and the destination) may be determined as a sum of the Euclidean distances, or not only horizontal and vertical distances but also diagonal distances between the cells of the pair.

At box 750, a safest path for travel from the origin to the destination is determined based on the combined costs. For example, a route between the origin and the destination having a lowest total cost may be calculated based on sums of the costs calculated at box 730 and the costs calculated at box 740. At box 760, an aerial vehicle is instructed to travel from the origin to the destination via the safest path determined at box 750, and the process ends. For example, in some embodiments, the aerial vehicle may be programmed or configured with sets of geolocations corresponding to centers of the respective cells within the safest path, and instructed to travel at specific courses, speeds or altitudes between such geolocations. Alternatively, the aerial vehicle may be programmed or configured with sets of geolocations corresponding to centers of the respective cells within the safest path, and instructed to autonomously select courses, speeds or altitudes for traveling between such geolocations, e.g., in accordance with any number of predetermined rules or restrictions.

Figure 8A:
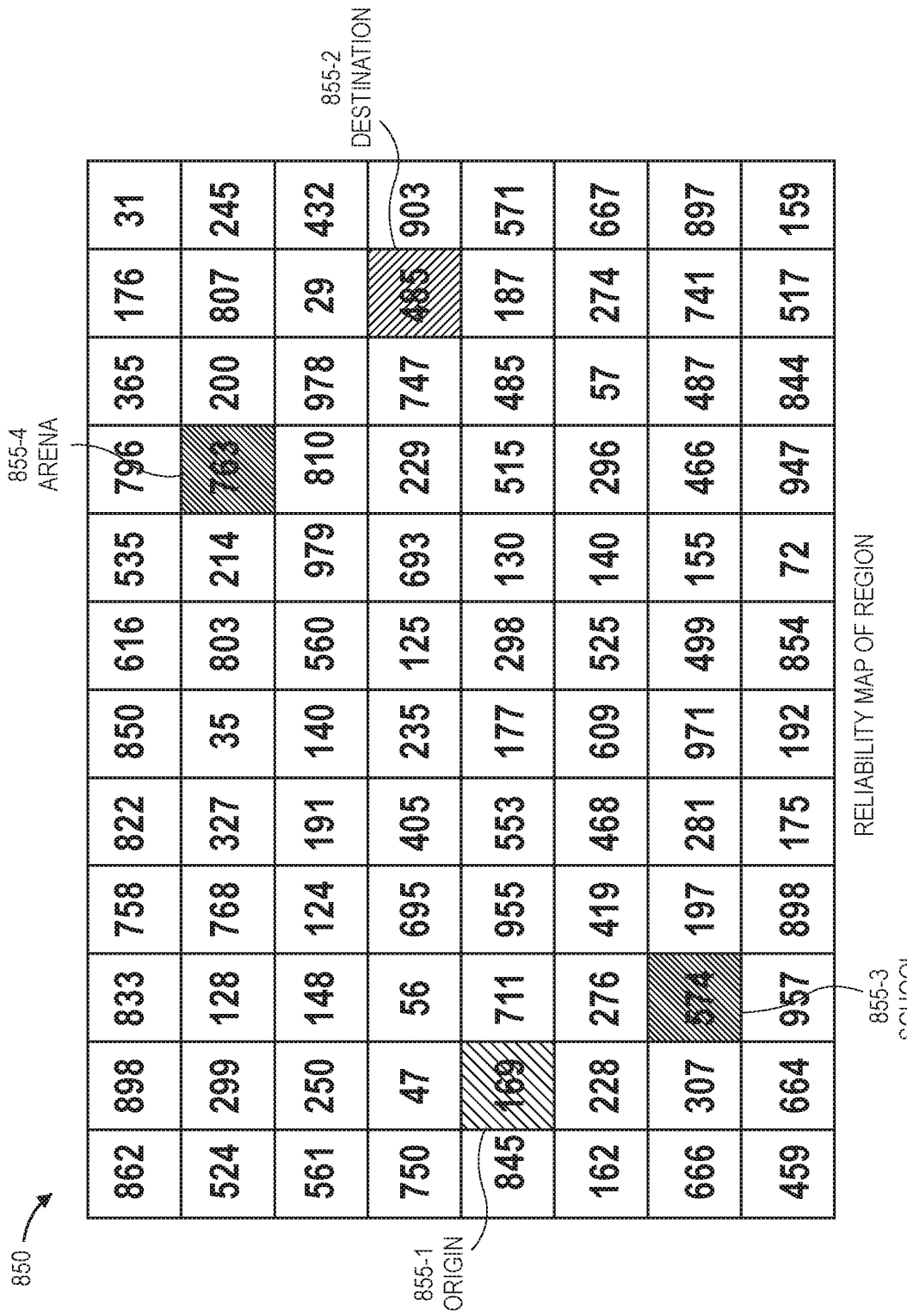
Figure 8B:
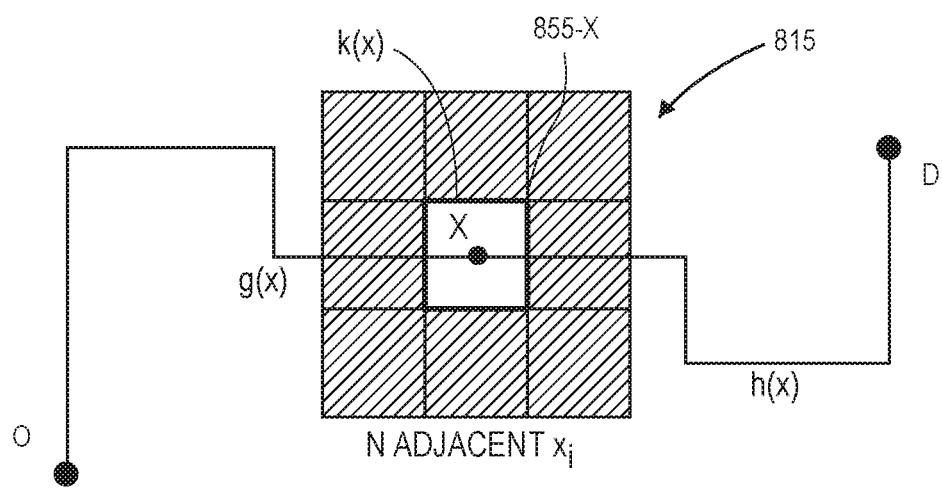

Referring to FIGS. 8A through 8C, views of aspects of systems for selecting safe flight routes in accordance with embodiments of the present disclosure are shown. Except where otherwise noted, reference numerals preceded by the number "8" shown in FIGS. 8A through 8C indicate components or features that are similar to components or features having reference numerals preceded by the number "6" shown in FIGS. 6A through 6D, by the number "5" shown in FIGS. 5A through 5C, by the number "4" shown in FIGS. 4A through 4I, by the number "2" shown in FIG. 2, or by the number "1" shown in FIGS. 1A through 1F.

As is shown in FIG. 8A, a reliability map 850 of a region includes a plurality of cells 855-1 through 855-96. Each of the cells 855-1 through 855-96 has an associated reliability score, which may be a population density, or any other measure of an amount of intrinsic data (e.g., a population) within zones of the region corresponding to such cells 855-1 through 855-96. The reliability map 850 identifies a cell 855-1 corresponding to an origin O for a mission, a cell 855-2 corresponding to a destination D of the mission, as well as cells 855-3, 855-4 corresponding to avoidable zones of critical infrastructure such as a school 855-3 and an arena 855-4.

As is shown in FIG. 8B, a route 815 may be calculated for travel throughout the region represented in the reliability map 850 according to a search algorithm or a cost minimization algorithm, such as an A* search algorithm. For example, as is shown in FIG. 8B, an A* search algorithm includes a cost (or cost function) g(x) for travel from an origin O to any given cell x and a cost (or cost function) h(x) for travel from the cell x to a destination D. The cost g(x) may be determined based on a sum of a distance do-x between the origin O and the cell x, a population density (or reliability score) of the cell x, and an average population density (or an average reliability score) of the N cells surrounding the cell x. The cost h(x) may be calculated based on heuristics, e.g., a Manhattan distance to the destination D, a Euclidean distance to the destination D, or on any other heuristically determined distance.

As is shown in FIG. 8C, the route 815 determined based on the A* search algorithm shown in FIG. 8B extends from a centroid of the cell 855-1 corresponding to the origin O through centroids of a plurality of cells to a centroid of the cell 855-2 corresponding to the destination D. The route 815 may be selected to minimize a population density of the cells traveled on the route 815, as well as to avoid the cells including the school 855-3 and the arena 855-4. Those of ordinary skill in the pertinent arts will recognize that modifications to the route 815 may be identified in any manner and by any device or system, including but not limited to a ground-based or "cloud"-based data processing system, or by one or more processors aboard the aerial vehicle. For example, the one or more modifications to the route 815 may be identified prior to an aerial vehicle taking off to complete a mission, or while the aerial vehicle is in flight. In some embodiments, a path or a route may be modified by changing any aspect of an aerial vehicle's operations.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, those of ordinary skill in the pertinent arts will recognize that reliability maps may be generated based on any type or form of data that is intrinsic to a geospatial area or geographic region, and are not limited to population data or locations of infrastructure. For example, in some embodiments, a number or a density of animals other than humans (e.g., endangered species), valuable objects (e.g., expensive or rare automobiles), physical features (e.g., mountains, trees, valleys) or other things may be considered in generating one or more scores of a reliability map. Information or data regarding such numbers or densities may be obtained from any source in accordance with embodiments of the present disclosure. Moreover, in some embodiments, values expressed within reliability maps may be high for cells, tessellations or other sections where levels of reliability or safety are high, and where levels of unreliability or risk are low. Likewise, in such embodiments, values expressed within reliability maps may be low for cells, tessellations or other sections where levels of reliability or safety are low, and where levels of unreliability or risk are high. Conversely, in some embodiments, values expressed within reliability maps may be low for cells, tessellations or other sections where levels of reliability or safety are high, and where levels of unreliability or risk or low. Likewise, in such embodiments, values expressed within reliability maps may be high for cells, tessellations or other sections where levels of reliability or safety are low, and where levels of unreliability or risk are high. Any values of reliability scores for depicting or representing levels of reliability of a given cell, tessellation or section at a given time may be included in a reliability map in accordance with embodiments of the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIG. 3 or 7, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale. In particular, the one or more of the models of exposure to noise are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A system comprising:
  at least one aerial vehicle;
  a server connected to a network, wherein the server is in communication with the at least one aerial vehicle,
  wherein the server is programmed with one or more instructions that, when executed, cause the server to at least:
    identify a geographic map of a region, wherein the geographic map includes a plurality of geospatial areas within the region;
    identify population data for at least some of the geospatial areas of the region;
    apply a first grid having a plurality of cells to the geographic map, wherein each of the plurality of cells has a common size;
    determine population densities for at least some of the plurality of cells based at least in part on the population data;
    calculate a reliability score for the at least some of the plurality of cells based at least in part on the population densities;
    generate a reliability map comprising the reliability scores for the at least some of the plurality of cells;

identify information regarding a mission requiring travel by an aerial vehicle from a first location within the region to a second location within the region;

identify a first cell within the geographic map, wherein the first location is within a first zone of the region corresponding to the first cell;

identify a second cell within the geographic map, wherein the second location is within a second zone of the region corresponding to the second cell;

calculate, for individual ones of the plurality of cells, a first cost of travel from the first cell to the individual ones of the plurality of cells and a second cost of travel from the individual ones of the plurality of cells to the second cell based at least in part on the reliability scores of the at least some of the plurality of cells, wherein the first cost is a measure of a sum of:
  a distance from the first cell to the individual ones of the plurality of cells;
  a population density of the individual ones of the plurality of cells; and
  a sum of population densities of a predetermined number of population densities of cells adjacent the individual ones of the plurality of cells divided by the predetermined number, and wherein the second cost is a measure of a distance from the individual ones of the plurality of cells to the second cell;

generate a route from the first zone to the second zone based at least in part on the reliability map and sums of the first cost and the second cost of the individual ones of the plurality of cells, wherein the route comprises at least a first path and a second path, wherein the first path extends between a centroid of the first cell and a centroid of a third cell, wherein the second path extends between the centroid of the third cell and a centroid of the second cell, and wherein the third cell is one of the plurality of cells; and program the aerial vehicle with at least one set of instructions to travel from the first zone to the second zone via the route in performing the mission.

2. The system of claim 1, wherein the one or more instructions, when executed, further cause the server to at least:

determine that at least one of a school, a hospital or a public safety building is located in a third location within the region; and identify a fourth cell within the geographic map, wherein the third location is within a third zone of the region corresponding to the fourth cell, wherein the route does not include a centroid of the fourth cell.

3. The system of claim 1, wherein the one or more instructions, when executed, further cause the server to at least:

determine at least one of a course, a speed, or an altitude for the aerial vehicle based at least in part on the information regarding the mission;

determine a minimum operating area for the aerial vehicle based at least in part on the course, the speed or the altitude; and select the common size of the plurality of cells based at least in part on the minimum operating area.

4. A method comprising:

retrieving a geographic map of a region, wherein the geographic map identifies a plurality of geospatial areas within the region;

identifying population data for individual ones of the geospatial areas of the region;

applying a first grid having a plurality of cells to the geographic map, wherein each of the plurality of cells has a common size;

calculating, for individual ones of the plurality of cells, a reliability score based at least in part on the population data for the individual ones of the geospatial areas of the region;

identifying information regarding a mission requiring travel by an aerial vehicle from a first location within the region to a second location within the region;

identifying a first cell of the plurality of cells within the geographic map, wherein the first location is within a first zone of the region corresponding to the first cell;

identifying a second cell of the plurality of cells within the geographic map, wherein the second location is within a second zone of the region corresponding to the second cell;

calculating, for individual ones of the plurality of cells, a first cost of travel from the first cell to the individual ones of the plurality of cells and a second cost of travel from the individual ones of the plurality of cells to the second cell based at least in part on population densities of at least some of the plurality of cells; and generating a route from the first zone to the second zone based at least in part on the reliability scores of the individual ones of the plurality of cells and sums of the first cost and the second cost of the individual ones of the plurality of cells, wherein the route comprises at least a first path and a second path, wherein the first path extends between a centroid of the first cell and a centroid of a third cell, wherein the second path extends between the centroid of the third cell and a centroid of the second cell, and wherein the third cell is one of the plurality of cells.

5. The method of claim 4, wherein the first path extends in at least a first one of a horizontal direction, a vertical direction or a diagonal direction, and wherein the second path extends in at least a second one of a horizontal direction, a vertical direction or a diagonal direction.

6. The method of claim 4, further comprising:

selecting at least one of a first course, a first speed, or a first altitude for traveling along the first path based at least in part on the information regarding the mission; and causing the aerial vehicle to operate on the first course, at the first speed and at the first altitude to travel along at least the first path.

7. The method of claim 4, further comprising:

identifying a facility at a third location within the region, wherein the facility comprises at least one of a school, a hospital or a public safety building; and determining that the third location is within a third zone of the region corresponding to a third cell of the plurality of cells, wherein the reliability score for the third cell is calculated based at least in part on the population data for one of the geospatial areas including the third location and the facility, and wherein the route does not extend through a centroid of the first cell.

8. The method of claim 4, further comprising:
selecting at least one of a course, a speed, or an altitude for traveling along the route based at least in part on the information regarding the mission;
determining a minimum operating area for the aerial vehicle based at least in part on the at least one of the course, the speed or the altitude; and
selecting the common size of the plurality of cells based at least in part on the minimum operating area.

9. The method of claim 4, wherein the population data comprises populations for the individual ones of the plurality of geospatial areas,
wherein calculating the reliability scores for the individual ones of the plurality of cells comprises:
dividing the populations for the individual ones of the plurality of geospatial areas by areas of the geospatial areas;
identifying, for the individual ones of the plurality of cells, at least one of the geospatial areas; and
calculating, for the individual ones of the plurality of cells, the reliability score based at least in part on a population density of the at least one of the geospatial areas.

10. The method of claim 4, wherein identifying the population data for the at least some of the geospatial areas of the region comprises:
retrieving population distribution data for each of a plurality of geographic subsets of the region from at least one data store over a network, wherein the population distribution data identifies numbers of people located in individual ones of the geographic subsets of the region, and wherein each of the geographic subsets has a width of one second of latitude and a height of one second of longitude; and
identifying individual ones of the plurality of geographic subsets associated with at least one of the geospatial areas,
wherein calculating the reliability scores for the individual ones of the plurality of cells based at least in part on the population data comprises:
calculating population densities of the individual ones of the plurality of geographic subsets associated with the at least one of the geospatial areas, wherein the population densities of the individual ones of the plurality of geographic subsets associated with the at least one of the geospatial areas are calculated by dividing the numbers of people living in the individual ones of the geographic subsets of the region by products of the widths and the heights of the individual ones of the geographic subsets; and
assigning the population densities of the individual ones of the plurality of geographic subsets associated with the at least one of the geospatial areas with the at least one of the geospatial areas.

11. The method of claim 4, wherein identifying the population data for the individual ones of the geospatial areas of the region comprises:
identifying a plurality of cellular telephone transmissions within the region; and
determining, for each of the plurality of cellular telephone transmissions within the region, one of the geospatial areas of the region from which the cellular telephone transmissions was transmitted.

12. The method of claim 4, wherein the first cost is a sum of:
a distance from the first cell to the individual ones of the plurality of cells;
a population density of the individual ones of the plurality of cells; and
a sum of population densities of a predetermined number of population densities of cells adjacent the individual ones of the plurality of cells divided by the predetermined number.

13. The method of claim 4, wherein each of the plurality of geospatial areas is one of:
a county;
a municipality;
a neighborhood;
an office complex;
a park;
a stadium; or
a state.

14. The method of claim 4,
wherein the mission is a delivery from the first location to the second location.

15. An aerial vehicle comprising:
at least one propulsion motor; and
a control system having at least one computer processor, wherein the control system is in communication with the at least one propulsion motor,
wherein the control system is programmed with one or more sets of instructions that, when executed by the at least one computer processor, cause the aerial vehicle to at least:
generate a reliability map of a region based at least in part on at least:
a geographic map of the region, wherein the geographic map of the region identifies a plurality of geospatial areas of the region;
population data for the plurality of geospatial areas of the region; and
a location of at least one building within the region,
wherein the reliability map of the region comprises a plurality of cells having a common size and identifies population densities of the plurality of cells and the location of the at least one building;
receive information regarding a mission requiring travel by an aerial vehicle from a first location within the region to a second location within the region;
identify a first cell within the reliability map, wherein the first location is within a first zone of the region corresponding to the first cell;
identify a second cell within the geographic map, wherein the second location is within a second zone of the region corresponding to the second cell;
calculate, for individual ones of the plurality of cells, a first cost of travel from the first cell to the individual ones of the plurality of cells and a second cost of travel from the individual ones of the plurality of cells to the second cell based at least in part on the population densities of at least some of the plurality of cells,
wherein the first cost is a sum of:
a distance from the first cell to the individual ones of the plurality of cells;
a population density of the individual ones of the plurality of cells; and
a sum of population densities of a predetermined number of population densities of cells adjacent the individual ones of the plurality of cells divided by the predetermined number;
generate a route from the first zone to the second zone based at least in part on the population densities of the at least some of the plurality of cells and the location of the at least one building within the region and sums of the first cost and the second cost of the individual ones of the plurality of cells, wherein the route comprises at least a first path and a second path, wherein the first path extends between a centroid of the first cell and a centroid of a third cell, wherein the second path extends between the centroid of the third cell and a centroid of the second cell, and wherein the third cell is one of the plurality of cells;

select at least one of a course, a speed, or an altitude for traveling along the route based at least in part on the information regarding the mission; and cause the aerial vehicle to operate on the course, at the speed and at the altitude to travel along the route.

16. The aerial vehicle of claim 15, wherein the mission is a delivery from the first location to the second location.

17. The aerial vehicle of claim 15, wherein each of the plurality of geospatial areas is one of:
a county;
a municipality;
a neighborhood;
an office complex;
a park;
a stadium; or
a state.

18. The aerial vehicle of claim 15, wherein the first path extends in at least a first one of a horizontal direction, a vertical direction or a diagonal direction, and
wherein the second path extends in at least a second one of a horizontal direction, a vertical direction or a diagonal direction.

19. The system of claim 1, wherein each of the plurality of geospatial areas is one of:
a county;
a municipality;
a neighborhood;
an office complex;
a park;
a stadium; or
a state.

20. The system of claim 1, wherein the first path extends in at least a first one of a horizontal direction, a vertical direction or a diagonal direction, and
wherein the second path extends in at least a second one of a horizontal direction, a vertical direction or a diagonal direction.

* * * * *